US012205752B2

(12) United States Patent
Yoshioka et al.

(10) Patent No.: US 12,205,752 B2
(45) Date of Patent: Jan. 21, 2025

(54) INDUCTOR COMPONENT AND INDUCTOR-INCLUDING STRUCTURE

(71) Applicant: Murata Manufacturing Co., Ltd., Kyoto-fu (JP)

(72) Inventors: Yoshimasa Yoshioka, Nagaokakyo (JP); Tatsuya Sasaki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 906 days.

(21) Appl. No.: 17/243,505

(22) Filed: Apr. 28, 2021

(65) Prior Publication Data

US 2021/0343468 A1 Nov. 4, 2021

(30) Foreign Application Priority Data

May 1, 2020 (JP) ................................ 2020-081295

(51) Int. Cl.

*H01F 27/29* (2006.01)
*H01F 27/255* (2006.01)
*H01F 27/28* (2006.01)
*H01F 41/02* (2006.01)
*H01F 41/06* (2016.01)

(52) U.S. Cl.

CPC ....... *H01F 27/2823* (2013.01); *H01F 27/255* (2013.01); *H01F 27/29* (2013.01); *H01F 41/0246* (2013.01); *H01F 41/06* (2013.01)

(58) Field of Classification Search

CPC .................................................. H01F 27/2823
USPC .......................................................... 336/192
See application file for complete search history.

(56) References Cited

U.S. PATENT DOCUMENTS

2019/0274217 A1* 9/2019 Zhang ................. H05K 3/0026

FOREIGN PATENT DOCUMENTS

| | | | |
|---|---|---|---|
| JP | H01-189216 | A | 7/1989 |
| JP | H05-013241 | A | 1/1993 |
| JP | 2011-129593 | A | 6/2011 |
| JP | 2012-222252 | A | 11/2012 |
| JP | 2015-082660 | A | 4/2015 |
| JP | 2016009833 | A | 1/2016 |
| JP | WO2016/047653 | A1 | 6/2017 |
| JP | 2018-046051 | A | 3/2018 |
| WO | 2016/047316 | A1 | 3/2016 |
| WO | 2018/139046 | A1 | 8/2018 |
| WO | 2019/082714 | A1 | 5/2019 |

* cited by examiner

*Primary Examiner* — Ronald Hinson
(74) *Attorney, Agent, or Firm* — Studebaker & Brackett PC

(57) ABSTRACT

In an inductor component, an inductor wire is formed inside a main body. The inductor wire has a circular columnar body extending in the height direction. An end surface of the inductor wire at a first end in the wire extending direction serves as a first external terminal and is exposed at a first terminal surface of the main body. The first external terminal is exposed only at the first terminal surface. An end surface of the inductor wire at a second end in the wire extending direction serves as a second external terminal and is exposed at a second terminal surface of the main body. The second external terminal is exposed only at the second terminal surface.

19 Claims, 14 Drawing Sheets

INDUCTOR COMPONENT AND INDUCTOR-INCLUDING STRUCTURE

CROSS-REFERENCE TO RELATED APPLICATION

This application claims benefit of priority to Japanese Patent Application No. 2020-081295, filed May 1, 2020, the entire content of which is incorporated herein by reference.

BACKGROUND

Technical Field

The present disclosure relates to an inductor component and an inductor-including structure.

Background Art

Japanese Unexamined Patent Application Publication No. 2016-009833 discloses an inductor component in which an annular coil core is disposed inside an insulating resin layer. An inductor wire is also disposed inside the insulating resin layer. The inductor wire is wound helically around the coil core in the core extending direction. The inductor wire has a first external terminal disposed at a first end of the inductor wire, and the first external terminal is exposed at a terminal surface. The terminal surface is one of the external surfaces of the insulating resin layer and serves as a mounting surface when the inductor component is mounted on a substrate. The inductor wire also has a second external terminal disposed at a second end of the inductor wire, and the second external terminal is exposed at the same terminal surface at which the first external terminal is exposed. The first external terminal and the second external terminal of the inductor wire are connected to the substrate by soldering or the like.

SUMMARY

In the inductor component disclosed by Japanese Unexamined Patent Application Publication No. 2016-009833, both ends of the inductor wire are exposed at the same terminal surface. Accordingly, the substrate on which the inductor component is mounted needs to have two electrodes. In addition, it is necessary to maintain a certain distance between these electrodes to prevent a short circuit when the inductor component is connected to the substrate by soldering. The solder flows to form a solder fillet and is adhered to an area larger than the exposed ends of the inductor wire. Accordingly, it is necessary to allow a larger area for the electrodes on the substrate than the area of the exposed ends of the inductor wire.

According to an aspect of the present disclosure, an inductor component includes a main body. The main body has a magnetic layer made of a magnetic material, a first terminal surface, and a second terminal surface positioned opposite to the first terminal surface in a height direction extending perpendicular to the first terminal surface. The inductor component further includes an inductor wire disposed in the main body and extending linearly in the height direction, a first external terminal disposed at a first end of the inductor wire, and a second external terminal disposed at a second end of the inductor wire, the second end being opposite to the first end. The first external terminal is exposed only at the first terminal surface, and the second external terminal is exposed only at the second terminal surface.

According to another aspect of the present disclosure, an inductor-including structure includes an inductor component. The inductor component includes a main body, and the main body has a magnetic layer made of a magnetic material, a first terminal surface, and a second terminal surface positioned opposite to the first terminal surface in a height direction extending perpendicular to the first terminal surface. The inductor component also includes an inductor wire disposed in the main body and extending linearly in the height direction, a first external terminal disposed at a first end of the inductor wire, and a second external terminal disposed at a second end of the inductor wire, the second end being opposite to the first end. The first external terminal is exposed only at the first terminal surface, and the second external terminal is exposed only at the second terminal surface. The inductor-including structure further includes an input wire through which an input voltage is applied to the first external terminal of the inductor component, and an output wire to which an output voltage is applied from the second external terminal of the inductor component. As viewed in the height direction, a connection end of the input wire connected to the first external terminal overlaps, at least partially, a connection end of the output wire connected to the second external terminal.

According to the above configurations, the first external terminal of the inductor wire is exposed at the first terminal surface. The second external terminal of the inductor wire is exposed at the second terminal surface. In other words, the first external terminal and the second external terminal are exposed at different surfaces. This eliminates the necessity of providing a space for preventing a short circuit that may be caused by soldering in the case of the first and second external terminals being exposed at the same surface. This can suppress an excess increase in the size of the first and second terminal surfaces of the inductor wire caused by providing the space required for preventing the short circuit during soldering.

According to the above configuration, it is easier to reduce the area on the substrate required for mounting the inductor component thereon.

Other features, elements, characteristics and advantages of the present disclosure will become more apparent from the following detailed description of preferred embodiments of the present disclosure with reference to the attached drawings.

DETAILED DESCRIPTION

Figure 1:
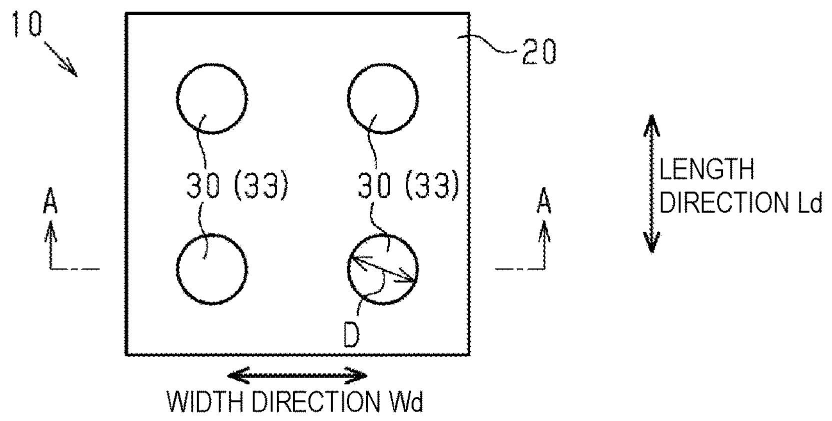
FIG. 1 is a top view illustrating an inductor component according to a first embodiment.

Embodiments of an inductor component and a method of manufacturing the inductor component will be described. Note that elements of the inductor component may be exaggerated in the drawings to facilitate better understanding. Dimensional ratios for the elements may be different from actual dimensional ratios and may be different from each other in different figures. Reference signs may not be assigned to all of the elements in the drawings.

First Embodiment

A first embodiment of the inductor component and a method of manufacturing the inductor component will be described.

As illustrated in FIG. 1, an inductor component 10 is formed of a main body 20 and four inductor wires 30.

Figure 2:
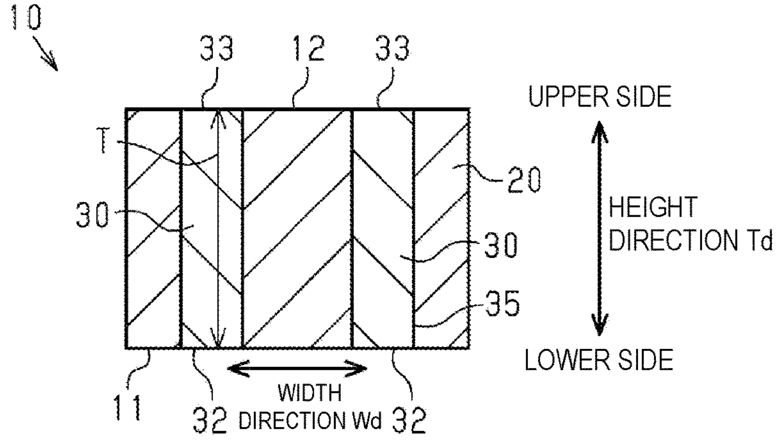
FIG. 2 is a cross-sectional view of the inductor component of the first embodiment, which is taken along line A-A in FIG. 1.

As illustrated in FIG. 2, the main body 20 has an external appearance of a regular quadrangular prism. The main body 20 is made of a resin that contains a magnetic powder such as iron powder. In the present embodiment, the main body 20 is formed of a magnetic layer that includes a magnetic material and exhibits magnetic properties. One of the external surfaces of the main body 20 is a first terminal surface 11. Another external surface of the main body 20 that is opposite to the first terminal surface 11 is a second terminal surface 12. A direction perpendicular to the first terminal surface 11 and the second terminal surface 12 is referred to as a "height direction Td" in the following description. In the height direction Td, the first terminal surface 11 is the bottom surface of the main body 20, and the second terminal surface 12 is the top surface thereof.

When the main body 20 is viewed in the height direction Td, the first terminal surface 11 is shaped like a square, and a direction in which a pair of opposite sides of the square extends is referred to as a "length direction Ld". When the main body 20 is viewed in the height direction Td, a direction perpendicular to the length direction Ld is referred to as a "width direction Wd". In the present embodiment, a maximum dimension of the main body 20 in the height direction Td is made smaller than a maximum dimension of the main body 20 in the length direction Ld and a maximum dimension of the main body 20 in the width direction Wd.

The inductor wires 30 are formed inside the main body 20. The inductor wires 30 are made of an electroconductive material. In the present embodiment, the inductor wires 30 contain 99 wt % of copper.

Each inductor wire 30 has a circular column body that extends from the bottom surface to the top surface in the height direction Td. In other words, the inductor wire 30 extends linearly in the height direction Td. In addition, as illustrated in FIG. 1, a cross-sectional shape of the inductor wire 30 taken in the length direction Ld and in the width direction Wd has a curved edge of which the widthwise and lengthwise portions are all curved. As illustrated in FIG. 2, the dimension of the inductor wire 30 in the height direction Td (hereinafter referred to as "the height T of the inductor wire 30") is the same as the dimension of the main body 20 in the height direction Td. When the inductor wire 30 is viewed in the height direction Td, the diameter D of the inductor wire 30 is smaller than the height T.

An end surface of the inductor wire 30 at a first end, which is an end in the wire extending direction, is exposed at the first terminal surface 11 of the main body 20. The end surface of the inductor wire 30 at the first end serves as a first external terminal 32. The first external terminal 32 is flush with the first terminal surface 11. The first external terminal 32 is exposed only at the first terminal surface 11 among the external surfaces of the main body 20.

An end surface of the inductor wire 30 at a second end, which is the other end in the wire extending direction, is exposed at the second terminal surface 12 of the main body 20. The end surface of the inductor wire 30 at the second end, which is opposite to the first end, serves as a second external terminal 33. The second external terminal 33 is flush with the second terminal surface 12. The second external terminal 33 is exposed only at the second terminal surface 12 among the external surfaces of the main body 20.

When the inductor wire 30 is viewed in the height direction Td, the position of the first external terminal 32 coincides with the position of the second external terminal 33. In other words, when the inductor wire 30 is viewed in the height direction Td, the first external terminal 32 and the second external terminal 33 overlap each other.

A side surface 35 is an external surface of the inductor wire 30 other than the external surfaces for the first external terminal 32 and the second external terminal 33. The side surface 35 of the inductor wire 30 is entirely covered with the main body 20.

As illustrated in FIG. 1, two inductor wires 30 forms one row that extends in the width direction Wd. Two rows of the inductor wires 30 are disposed side by side in the length direction Ld. In other words, four inductor wires 30 are provided in total, and two of them are arranged respectively in the width direction Wd and in the length direction Ld at the first terminal surface 11.

Next, a method of manufacturing the inductor component 10 of the first embodiment will be described.

Figure 3:
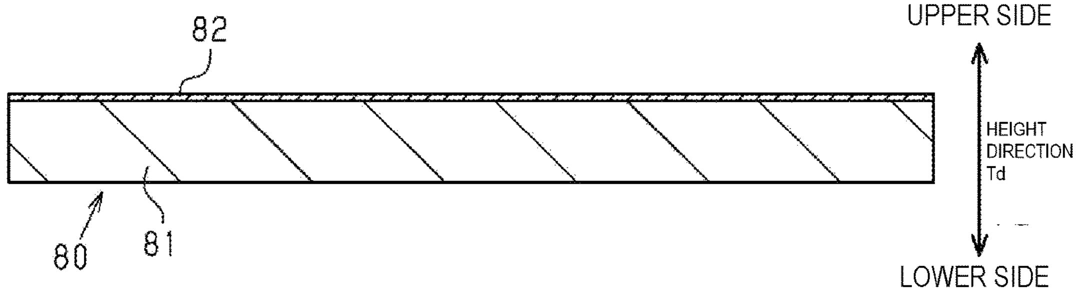
FIG. 3 is a diagram for explanation of a method of manufacturing the inductor component of the first embodiment.

In manufacturing the inductor component 10, a copper-coated base substrate 80 as illustrated in FIG. 3 is prepared first. The copper-coated base substrate 80 has a tabularly shaped base substrate 81. A copper film 82 is laminated on the upper side of the base substrate 81 in the stacking direction.

Figure 4:
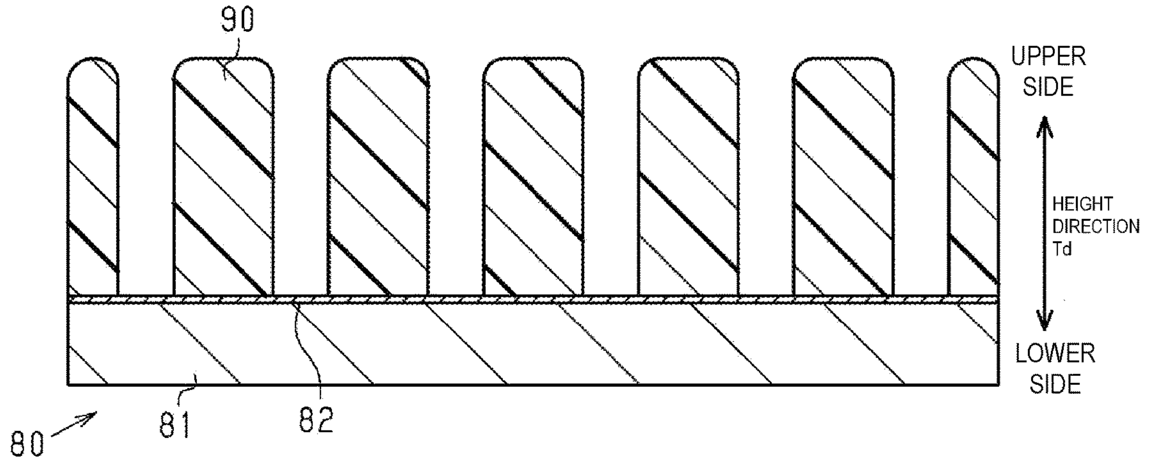
FIG. 4 is a diagram for explanation of the method of manufacturing the inductor component of the first embodiment.

Next, a first resist layer 90 is formed as follows. As illustrated in FIG. 4, the first resist layer 90 is patterned on the upper surface of the copper film 82 of the copper-coated base substrate 80. The first resist layer 90 covers portions of the upper surface on which the inductor wires 30 are not formed. More specifically, a photosensitive dry film resist is applied onto the entire upper surface of the copper film 82. Subsequently, the portions of the upper surface of the copper film 82 on which inductor wires 30 are not formed are exposed to light. This solidifies the light-exposed portions of the applied dry film resist. The unsolidified portions of the applied dry film resist are removed by chemical cleaning. The solidified portion of the applied dry film resist serves as the first resist layer 90. On the other hand, the copper film 82 is exposed at the portions not covered by the first resist layer 90, in other words, exposed at the portions from which the applied dry film resist has been removed by chemical cleaning.

Figure 5:
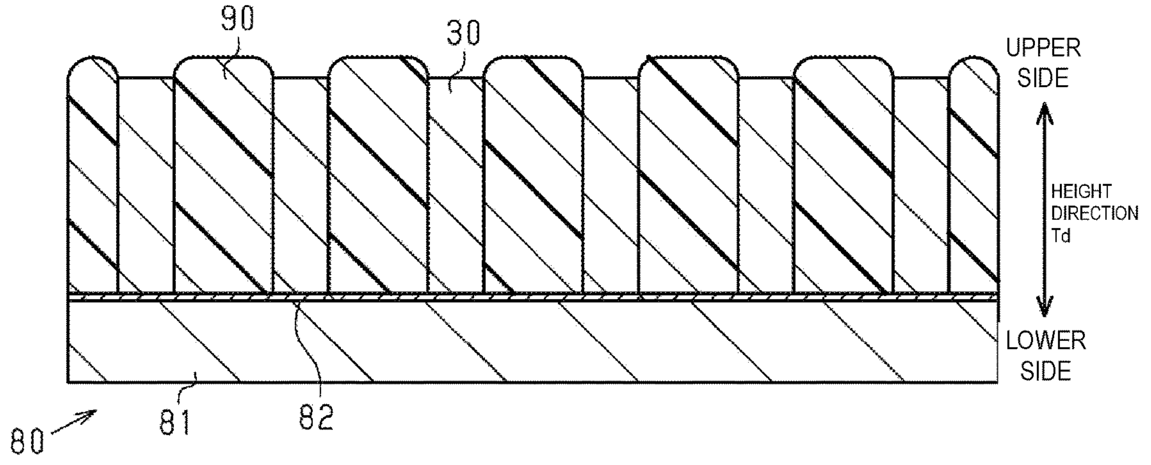
FIG. 5 is a diagram for explanation of the method of manufacturing the inductor component of the first embodiment.

Next, the inductor wires 30 are formed. As illustrated in FIG. 5, the inductor wires 30 are formed on the upper surface of the copper film 82 of the copper-coated base substrate 80 at positions where the first resist layer 90 is not formed. More specifically, electrolytic copper plating is performed by immersing the upper surface of the copper film 82 in an electrolytic copper plating solution, thereby forming the inductor wires 30 having a copper content of 99 wt % or more on the upper surface of the copper film 82.

Figure 6:
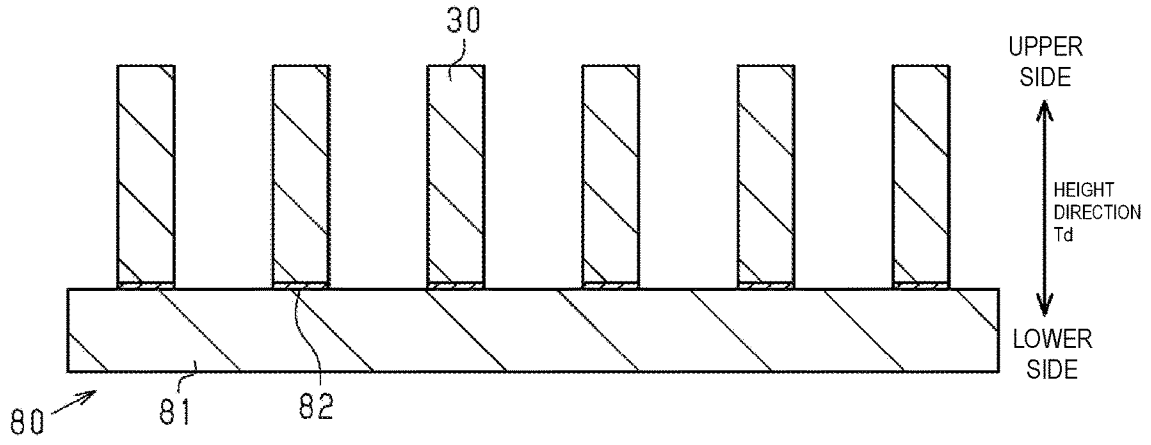
FIG. 6 is a diagram for explanation of the method of manufacturing the inductor component of the first embodiment.

Next, the first resist layer 90 is removed. As illustrated in FIG. 6, the first resist layer 90 is peeled off from the copper-coated base substrate 80 by physically grabbing a portion of the first resist layer 90 and separating the first resist layer 90 from the copper-coated base substrate 80.

Next, a residual copper film 82 protruding from the inductor wires 30 is removed. More specifically, etching is performed to remove the residual copper film 82 protruding from the inductor wires 30.

Figure 7:
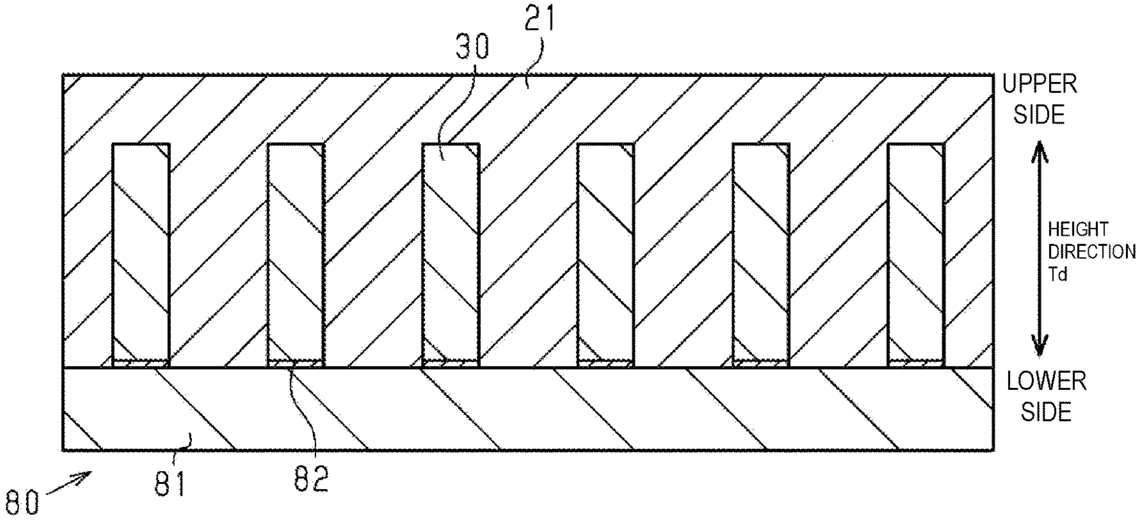
FIG. 7 is a diagram for explanation of the method of manufacturing the inductor component of the first embodiment.

Next, a magnetic powder-containing resin is applied. The magnetic powder-containing resin is the material of the main body 20. As illustrated in FIG. 7, the magnetic powder-containing resin is applied so as to cover the top surfaces of the inductor wires 30. The magnetic powder-containing resin is solidified by press forming to form a first magnetic layer 21. The first magnetic layer 21 serves as the main body 20.

Figure 8:
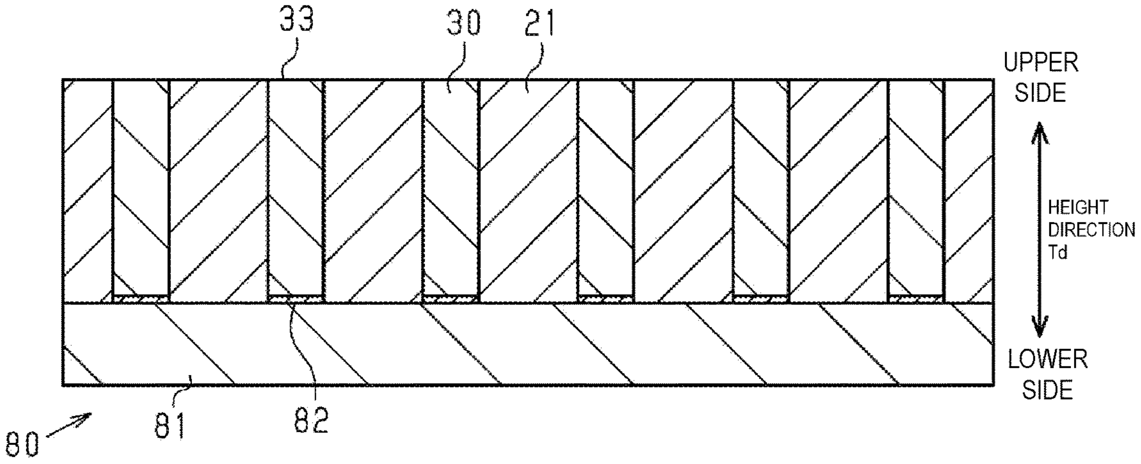
FIG. 8 is a diagram for explanation of the method of manufacturing the inductor component of the first embodiment.

Next, an upper portion of the first magnetic layer 21 is removed. As illustrated in FIG. 8, the upper portion of the first magnetic layer 21 is shaved off so as to expose the top surfaces of the inductor wires 30, in other words, so as to expose the second external terminals 33.

Figure 9:
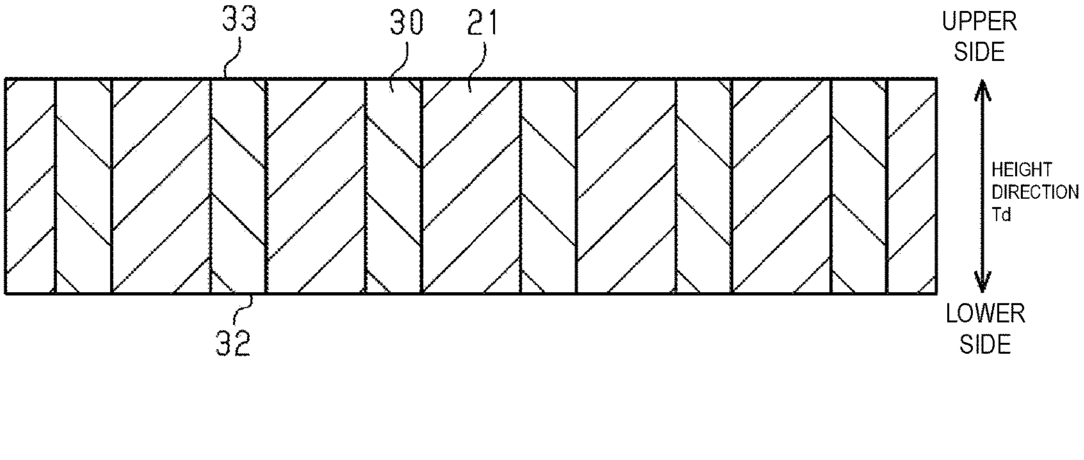
FIG. 9 is a diagram for explanation of the method of manufacturing the inductor component of the first embodiment.

Next, the copper-coated base substrate 80 is removed. As illustrated in FIG. 9, the copper-coated base substrate 80 is shaved off so as to expose the bottom surfaces of the inductor wires 30, in other words, so as to expose the first external terminals 32 of the inductor wires 30. In the present embodiment, the bottom surfaces of the inductor wires 30 are exposed by completely shaving off the copper film 82.

Figure 10:
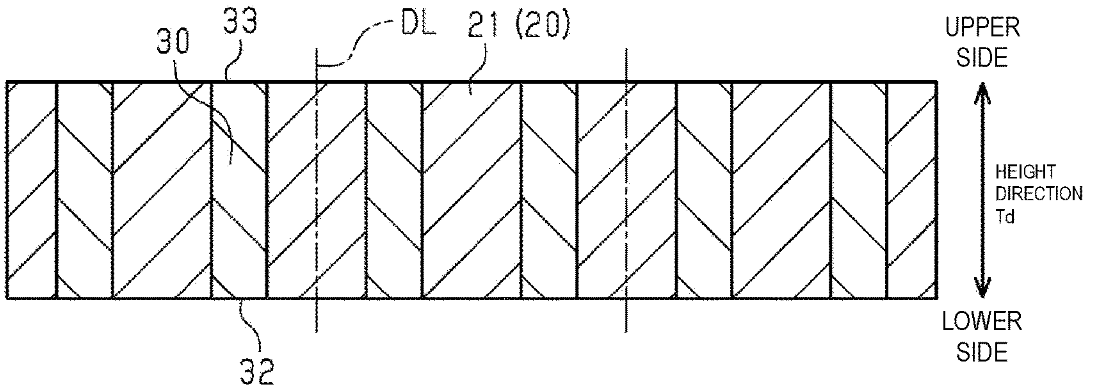
FIG. 10 is a diagram for explanation of the method of manufacturing the inductor component of the first embodiment.

Next, the workpiece prepared as above is cut into individual components. As illustrated in FIG. 10, the workpiece is cut along dash-dot lines DL drawn in the first magnetic layer 21 using a dicing machine to obtain individual components. Thus, the inductor components 10 each including four inductor wires 30 inside the main body 20 can be obtained.

Next, advantageous effects of the inductor component 10 of the first embodiment will be described.

1.1 According to the inductor component 10 of the first embodiment, each inductor wire 30 extends substantially linelike (i.e., substantially linearly) in the height direction Td. The first external terminal 32 is exposed only at the first terminal surface 11. The second external terminal 33 is exposed only at the second terminal surface 12. In other words, the first external terminal 32 and the second external terminal 33 are exposed at different surfaces. This eliminates the necessity of providing a space for preventing a short circuit between a solder bump for the first external terminal 32 and a solder bump for the second external terminal 33, which would be otherwise necessary if the first external terminal 32 and the second external terminal 33 were exposed at a single surface. Providing a space for preventing the short circuit between solder bumps at the first terminal surface 11 or at the second terminal surface 12 of the inductor component 10 leads to an increase in the size of the first terminal surface 11 and the second terminal surface 12 of the inductor component 10. With the above configuration, however, an excess increase in the sizes of the first terminal surface 11 and the second terminal surface 12 can be prevented.

1.2 According to the inductor component 10 of the first embodiment, the height T of the inductor wire 30 is greater than the diameter D of the inductor wire 30 as viewed in the height direction Td. In other words, the inductor wire 30 is elongated in the height direction Td. The area of the first external terminal 32 and the second external terminal 33 can be reduced relative to the inductance obtained by the inductor wire 30.

1.3 According to the inductor component 10 of the first embodiment, the first external terminal 32 and the second external terminal 33 overlap each other as viewed in the height direction Td. When the inductor component 10 is mounted on a substrate, this can minimize the area of the substrate for each inductor wire 30. In other words, the area of the substrate required for mounting each inductor wire 30 is only the area of the first external terminal 32 with an area for soldering.

1.4 According to the inductor component 10 of the first embodiment, the first end of the inductor wire 30 serves as the first external terminal 32. Accordingly, when the inductor wire 30 is viewed in a direction perpendicular to the first terminal surface 11, the inductor wire 30 is disposed in the entire area of the first external terminal 32 and the second external terminal 33. Even if the area of the first external terminal 32 and the second external terminal 33 of the inductor wire 30 is reduced, the diameter D of the circle of the inductor wire 30 as viewed in the height direction Td can be maximized within the range where the area of the first external terminal 32 is equal to the area of the second external terminal 33. This can maximize the inductance of the inductor wire 30.

1.5 According to the inductor component 10 of the first embodiment, a maximum dimension of the main body 20 in the height direction Td is made smaller than a maximum dimension of the main body 20 in the length direction Ld or in the width direction Wd. Accordingly, the center of gravity of the main body 20 is lowered compared with the case in which a maximum dimension of the main body 20 in the height direction Td is made greater than a maximum dimension of the main body 20 in the length direction Ld or in the width direction Wd. This increases the stability of the inductor component 10 when it is mounted on a substrate.

1.6 According to the inductor component 10 of the first embodiment, the entire side surface 35 of the inductor wire 30 is covered with the main body 20 or the magnetic layer. When electric current passes through the inductor wire 30, a magnetic circuit is formed so as to pass through the magnetic material. This can reduce a leakage flux.

1.7 According to the method of manufacturing the inductor component 10 of the first embodiment, when the first magnetic layer 21 is formed by applying the magnetic powder-containing resin, the magnetic powder-containing resin fills the space between the inductor wires 30. If the cross-sectional shape of each inductor wire 30 taken in a direction perpendicular to the height direction Td has linear edges and the linear edges of adjacent inductor wires 30 are narrowly spaced, it may be difficult to fill the narrow space between adjacent inductor wires 30 with the magnetic powder-containing resin appropriately. According to the inductor component 10 of the first embodiment, however, the inductor wire 30 has a circular cross section when taken in a direction perpendicular to the height direction Td. Accordingly, the cross-sectional shape of the inductor wire 30 has a curved edge. This facilitates placement of the magnetic powder-containing resin to fill the space, which makes the first embodiment advantageous in manufacturing the inductor component 10.

1.8 According to the inductor component 10 of the first embodiment, the inductor component 10 includes multiple inductor wires 30. In the case of an inductor component having a single inductor wire, it is necessary to install four inductor components if four inductor wires 30 are required. In the present embodiment, however, it is only necessary to install one inductor component 10 for four inductor wires 30.

1.9 If the inductor wire 30 had a portion that extends along the first terminal surface 11, the dimension of the inductor component 10 in the length direction Ld or in the width direction Wd would be larger than the dimension of the first external terminal 32 in the length direction Ld or in the width direction Wd. According to the inductor component 10 of the first embodiment, however, the inductor wire 30 extends linearly. Accordingly, the area of the first terminal surface 11 is no larger than the sum of the area of the first external terminal 32 and the area of the main body 20 that covers the inductor wire 30. In other words, it is not necessary to provide the first terminal surface 11 with an additional area so as to enable the inductor wire 30 to extend along the first terminal surface 11. This reduces the likelihood of the size of the first terminal surface 11 increasing excessively.

Second Embodiment

A second embodiment of the inductor component and a method of manufacturing the inductor component will be described.

The second embodiment is different from the first embodiment mainly in that in the inductor component 110 of the second embodiment, the main body 20 has the first magnetic layer 21 and a first insulating film 40 that covers each inductor wire 30. Note that the first magnetic layer 21 has the same configuration as that of the main body 20 of the inductor component 10 of the first embodiment. In the following description, elements similar to those of the first embodiment are denoted by the same reference signs, and the descriptions of such elements will be omitted or simplified.

Figure 11:
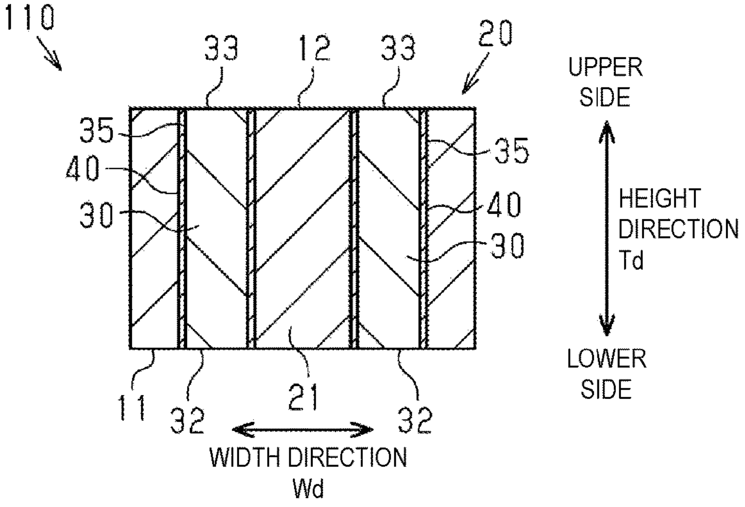
FIG. 11 is a cross-sectional view illustrating an inductor component according to a second embodiment.

As illustrated in FIG. 11, in the inductor component 110, the side surface 35 of each inductor wire 30 is entirely covered with the first insulating film 40. The first insulating film 40 is made of an insulating material, which is epoxy resin in the present embodiment. The film thickness of the first insulating film 40 is substantially uniform.

The first magnetic layer 21 is in contact with a surface of the first insulating film 40 that is opposite to the other surface in contact with the inductor wire 30. Accordingly, the entire side surface 35 of the inductor wire 30 is covered with the first magnetic layer 21 made of the magnetic material.

Next, a method of manufacturing the inductor component 110 of the second embodiment will be described.

Figure 12:
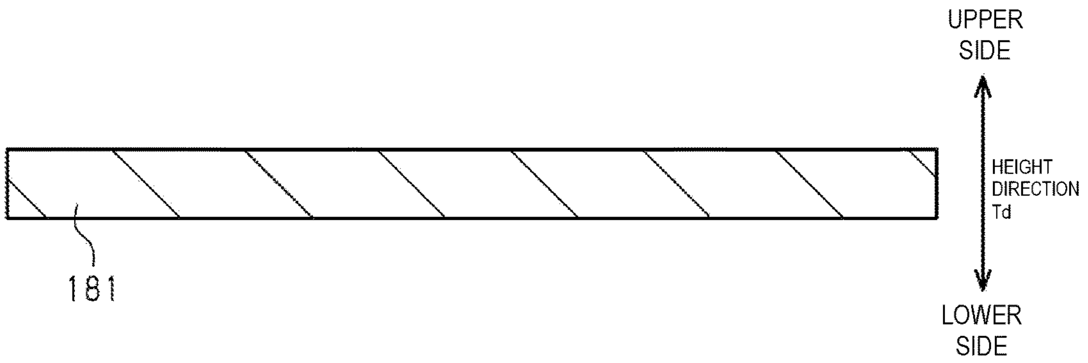
FIG. 12 is a diagram for explanation of a method of manufacturing the inductor component of the second embodiment.

In manufacturing the inductor component 110, a base substrate 181 as illustrated in FIG. 12 is prepared first. The base substrate 181 is shaped tabularly.

Figure 13:
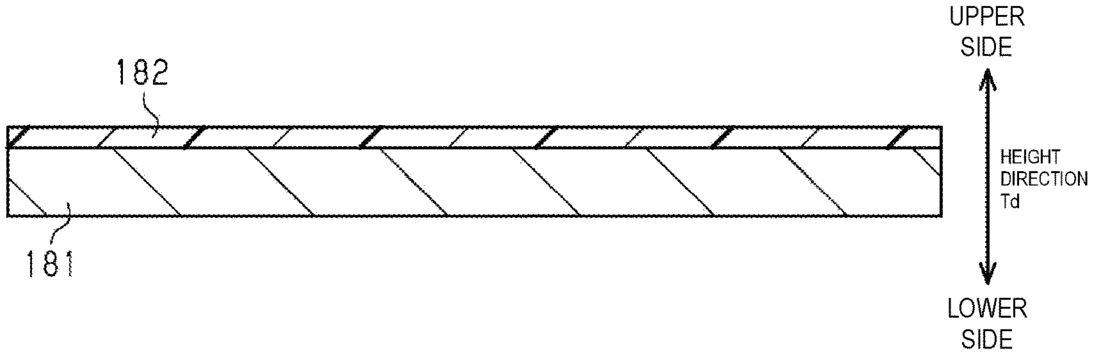
FIG. 13 is a diagram for explanation of the method of manufacturing the inductor component of the second embodiment.

Next, an adhesive layer 182 is adhered to the upper surface of the base substrate 181. In the present embodiment, the adhesive layer 182 illustrated in FIG. 13 is formed as a removable sticker that can be peeled off after adhered to the base substrate 181. A surface of the adhesive layer 182 opposite to the surface adhered to the base substrate 181 is also adhesive. Accordingly, the adhesive layer 182 has adhesive surfaces on both sides.

Figure 14:
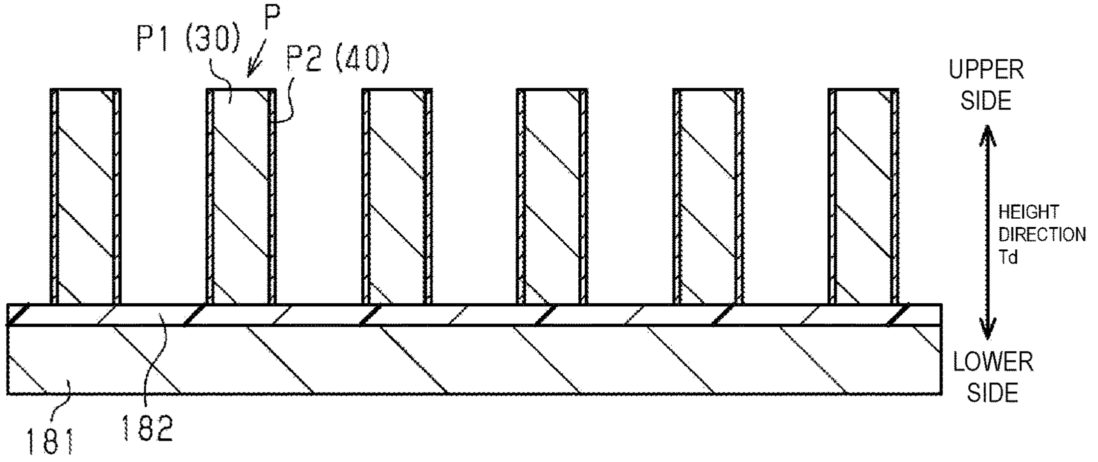
FIG. 14 is a diagram for explanation of the method of manufacturing the inductor component of the second embodiment.

Next, columnar metal members P are adhered to the upper surface of the adhesive layer 182. As illustrated in FIG. 14, each columnar metal member P is shaped like a circular column and has a rigid metal portion P1 and an insulating portion P2. The metal portion P1 is shaped like a circular column. The metal portion P1 is made of copper. The metal portion P1 has a side surface that orthogonally intersects the surface to be adhered to the adhesive layer 182, and the insulating portion P2 covers the entire side surface. The thickness of the insulating portion P2 is substantially uniform. The insulating portion P2 is made of epoxy resin. In the present embodiment, the metal portion P1 serves as the inductor wire 30, and the insulating portion P2 serves as the first insulating film 40, which will be described later.

Figure 15:
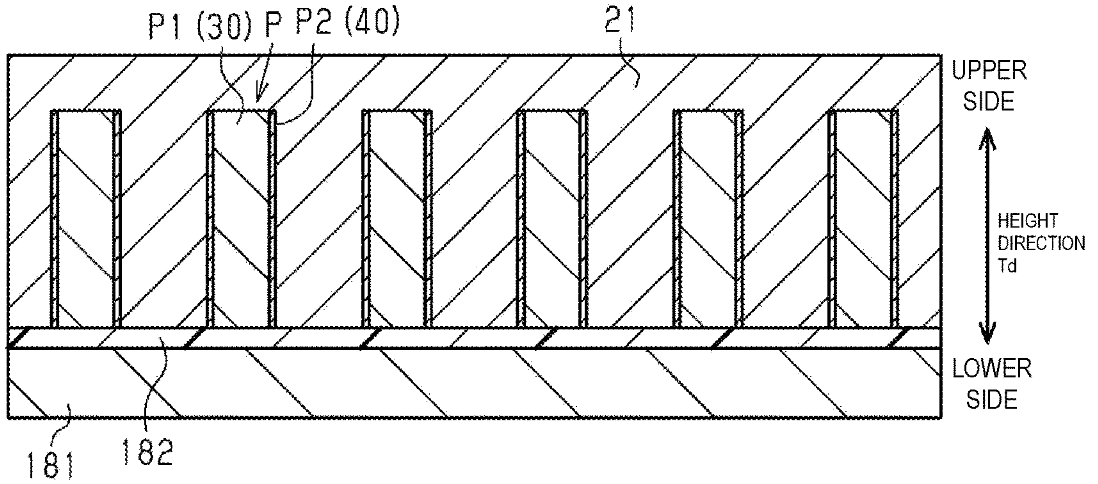
FIG. 15 is a diagram for explanation of the method of manufacturing the inductor component of the second embodiment.

Next, as illustrated in FIG. 15, the first magnetic layer 21, which is made of a sintered magnetic material, is adhered to the adhesive layer 182. In the present embodiment, the first magnetic layer 21 has multiple holes recessed therein. The first magnetic layer 21 is adhered to the adhesive layer 182 so as to accommodate the columnar metal members P in the holes.

Figure 16:
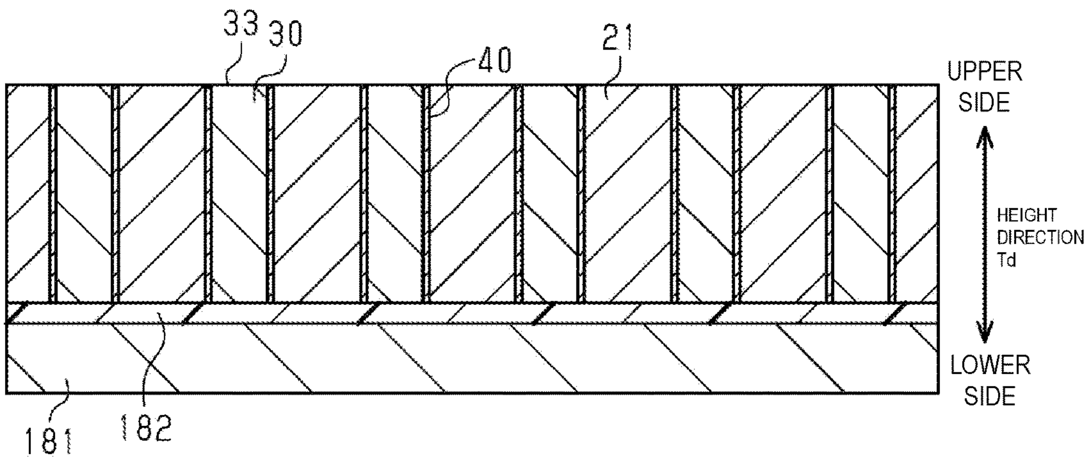
FIG. 16 is a diagram for explanation of the method of manufacturing the inductor component of the second embodiment.

Next, an upper portion of the first magnetic layer 21 is removed. As illustrated in FIG. 16, the upper portion of the first magnetic layer 21 is shaved off so as to expose the top surfaces of the columnar metal members P. This exposes the top surfaces of the columnar metal members P, thereby forming the second external terminals 33 of the inductor wires 30.

Figure 17:
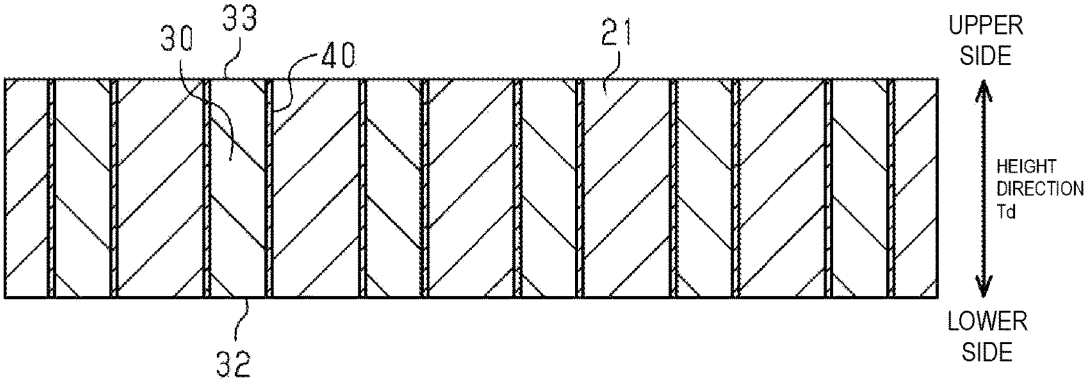
FIG. 17 is a diagram for explanation of the method of manufacturing the inductor component of the second embodiment.

Next, the base substrate 181 and the adhesive layer 182 are removed. As illustrated in FIG. 17, the upper surface of the adhesive layer 182 is detached from the lower surface of the first magnetic layer 21 by physically grabbing the base substrate 181 and the adhesive layer 182. This exposes the bottom surfaces of the columnar metal members P at the lower surface of the first magnetic layer 21, thereby forming the first external terminals 32 of the inductor wires 30. The metal portions P1 are formed as the inductor wires 30, and the insulating portions P2 covering the metal portions P1 are formed as the first insulating films 40. The workpiece prepared as above is subsequently cut into individual components. Thus, the inductor components 110 in each of which the inductor wires 30 covered with respective first insulating films 40 is included inside the main body 20 can be obtained.

Next, advantageous effects of the inductor component 110 of the second embodiment will be described. According to the second embodiment, the following advantageous effects can be also obtained in addition to 1.1 to 1.6, 1.8, and 1.9 described above.

2.1 According to the inductor component 110 of the second embodiment, the first insulating film 40 is interposed between each inductor wire 30 and the first magnetic layer 21. This ensures insulation between the inductor wire 30 and the first magnetic layer 21.

2.2 According to the method of manufacturing the inductor component 110 of the second embodiment, the columnar metal members P form the inductor wires 30 and the first insulating films 40. Preparing the columnar metal members P can omit a plating step or the like to be performed in the process for the first embodiment.

2.3 According to the inductor component 110 of the second embodiment, each inductor wire 30 is shaped like a circular column extending in the height direction Td. Accordingly, when a cross section of the inductor wire 30 is taken in a direction perpendicular to the extending direction of the inductor wire 30, the shape of the cross section has a curved edge. Accordingly, when the first insulating film 40 is formed, it is easier to reduce the variation of the thickness compared with the case in which the inductor wire 30 has a cross-sectional shape having corners.

Third Embodiment

A third embodiment of the inductor component and a method of manufacturing the inductor component will be described.

The third embodiment is different from the second embodiment mainly in that in an inductor component 210 of the third embodiment, the main body 20 includes the first magnetic layer 21 and the first insulating films 40 and also includes second insulating films 50 that cover respective first insulating films 40. In the following description, elements similar to those of the second embodiment are denoted by the same reference signs, and the descriptions of such elements will be omitted or simplified.

Figure 18:
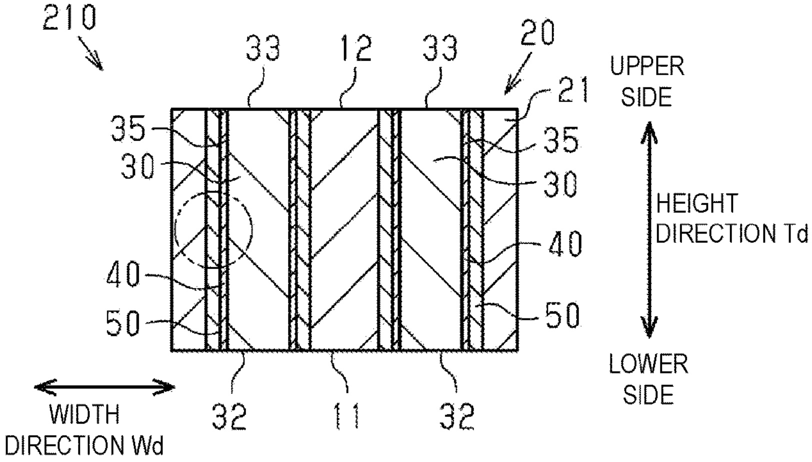
FIG. 18 is a cross-sectional view illustrating an inductor component according to a third embodiment.
Figure 19:
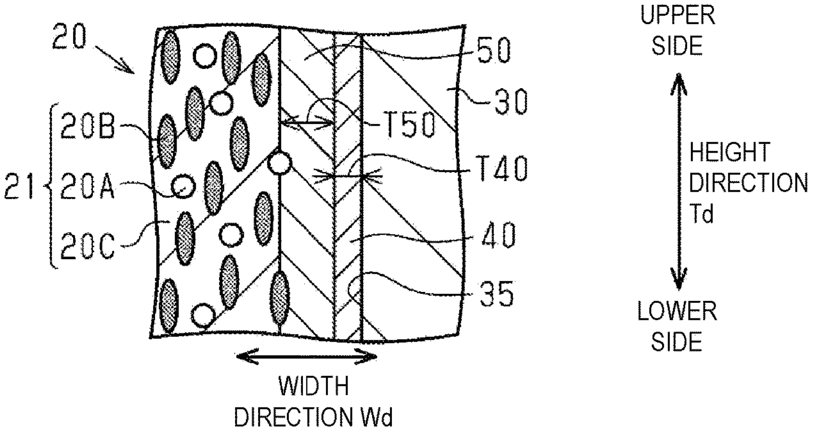
FIG. 19 is an enlarged cross-sectional view illustrating part of the inductor component of the third embodiment, the part being surrounded by a dash-dot-dot line in FIG. 18.

In the inductor component 210, as illustrated in FIG. 18, the side surface 35 of each inductor wire 30 is entirely covered with the first insulating film 40. Moreover, the outside surface of the first insulating film 40 is covered with a second insulating film 50. In other words, the second insulating film 50 is in contact with the outside surface of the first insulating film 40 that is opposite to the surface in contact with the inductor wire 30. The second insulating film 50 is made of an insulating material, which is epoxy resin in the present embodiment. As illustrated in FIG. 19, the film thickness T50 of the second insulating film 50 is substantially constant. The film thickness T50 of the second insulating film 50 is greater than the film thickness T40 of the first insulating film 40.

In the inductor component 210, as illustrated in FIG. 19, the first magnetic layer 21 of the main body 20 includes an inorganic filler 20A, a magnetic powder 20B, and a resin 20C. The magnetic powder 20B is made of a magnetic metal, such as iron or an iron alloy, or of a magnetic metal oxide, such as ferrite, and the particles are substantially shaped like needles. The inorganic filler 20A is made of the same magnetic substance as that of the magnetic powder 20B or of a non-magnetic inorganic substance, such as silica, alumina, or barium sulfate, and the particles are substantially shaped like spheres.

Some particles of the inorganic filler 20A and of the magnetic powder 20B in the first magnetic layer 21 protrude partially into the second insulating film 50. In other words, some particles of the inorganic filler 20A and the magnetic powder 20B are present between the second insulating film 50 and the first magnetic layer 21. More specifically, some particles of the inorganic filler 20A and the magnetic powder 20B have a surface portion in contact with the first magnetic layer 21 and also have a surface portion in contact with the second insulating film 50. On the other hand, particles of the inorganic filler 20A and of the magnetic powder 20B are not present between the first insulating film 40 and the second insulating film 50.

Next, a method of manufacturing the inductor component 210 of the third embodiment will be described.

In manufacturing the inductor component 210, the adhesive layer 182 is first adhered to the upper surface of the base substrate 181 as is the case for the second embodiment.

Figure 20:
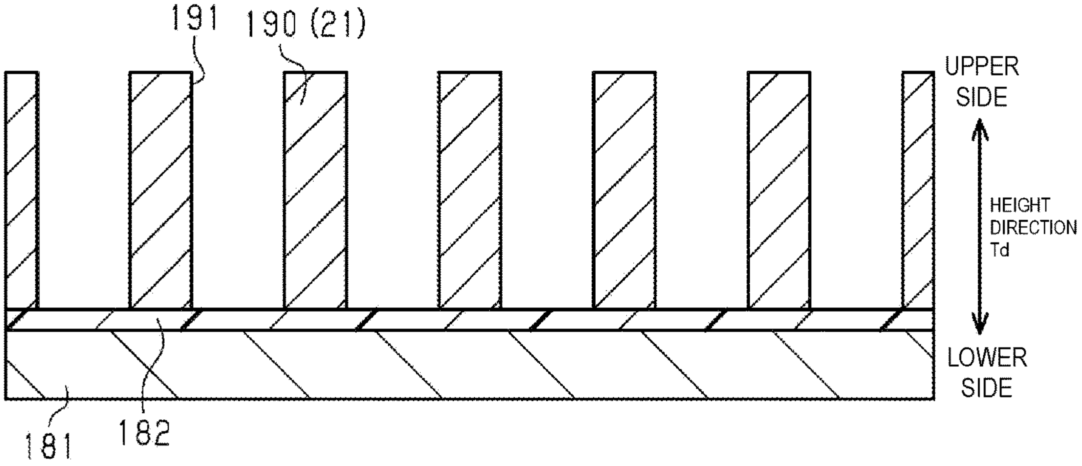
FIG. 20 is a diagram for explanation of a method of manufacturing the inductor component of the third embodiment.

Next, as illustrated in FIG. 20, a magnetic sheet 190, which is made of a magnetic powder-containing resin, is adhered to the upper surface of the adhesive layer 182. The magnetic sheet 190 forms the first magnetic layer 21, which will be described later. The magnetic sheet 190 is generally shaped tabularly and has holes 191 with a diameter larger than the diameter of the columnar metal members P.

Figure 21:
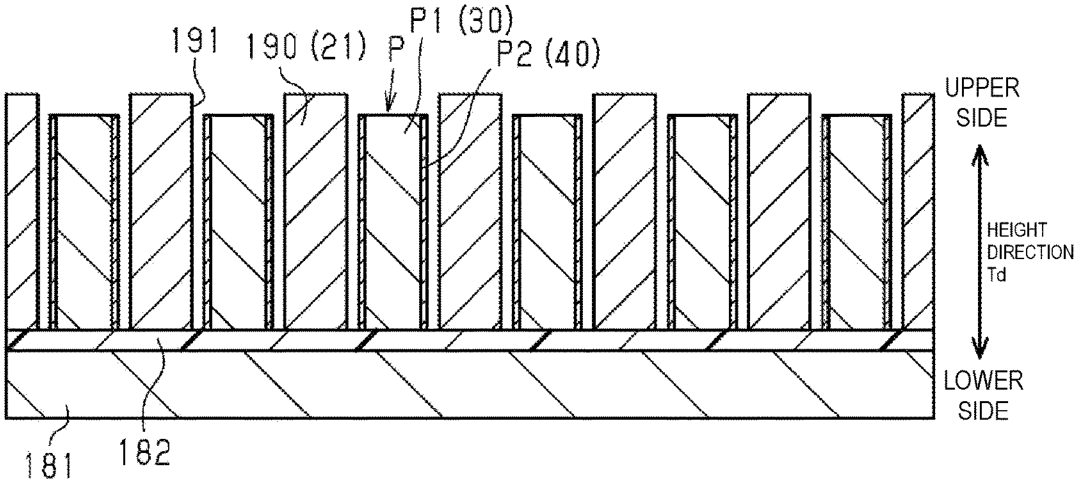
FIG. 21 is a diagram for explanation of the method of manufacturing the inductor component of the third embodiment.

Next, as illustrated in FIG. 21, the columnar metal members P having rigidity are disposed in respective holes 191 of the magnetic sheet 190. The bottom surface of each columnar metal member P is adhered to the adhesive layer 182. Here, the diameter of each hole 191 is made larger than the diameter of the columnar metal member P, and a gap is formed between the columnar metal member P and the surface of the corresponding hole 191. The gap is made wider than the thickness of the insulating portion P2 of the columnar metal member P.

Figure 22:
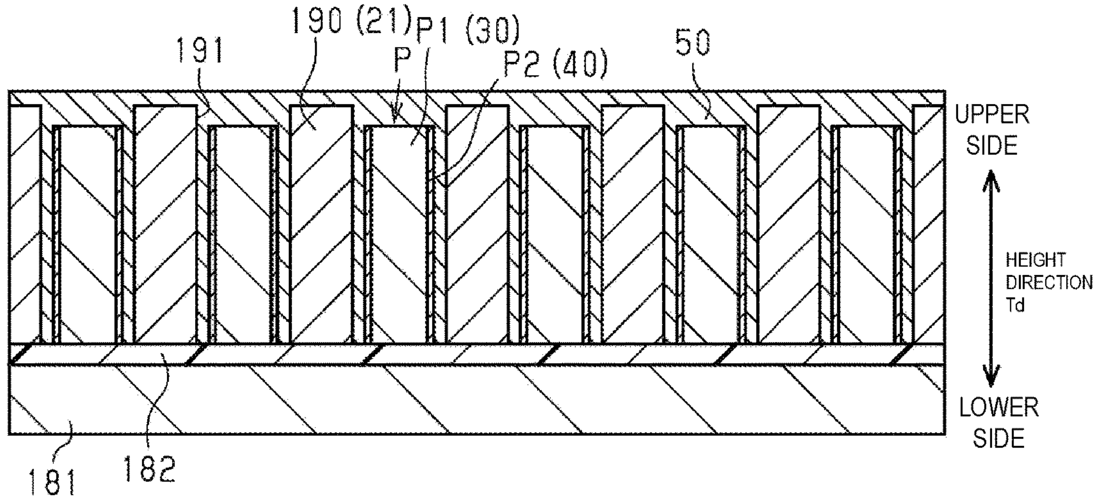
FIG. 22 is a diagram for explanation of the method of manufacturing the inductor component of the third embodiment.

Next, as illustrated in FIG. 22, an insulating resin is poured onto the magnetic sheet 190. More specifically, the insulating resin is poured into the gap between the inside surface of each hole 191 of the magnetic sheet 190 and the outside surface of the corresponding columnar metal member P until the insulating resin covers the upper surface of the magnetic sheet 190. The insulating resin is solidified by press forming to form the second insulating film 50.

An upper portion of the insulating resin is shaved off so as to expose the top surfaces of the columnar metal members P, thereby forming the second external terminals 33 of the inductor wires 30. The first external terminals 32 of the inductor wires 30 are formed by peeling off the base substrate 181 and the adhesive layer 182. The workpiece prepared as above is cut at the magnetic sheet 190 to obtain individual main bodies 20. Thus, the inductor component 210 can be obtained, in which the inductor wires 30 covered with the first insulating films 40 and the second insulating films 50 are disposed inside the main body 20.

Next, advantageous effects of the inductor component 210 of the third embodiment will be described. According to the third embodiment, the following advantageous effects can be also obtained in addition to 1.1 to 1.9 and 2.1 to 2.3 described above.

3.1 According to the inductor component 210 of the third embodiment, the outside surface of the first insulating film 40 is covered with the second insulating film 50. For example, there may be a case in which the material of the first insulating film 40 is selected so as to improve the adhesion to the inductor wires 30 while sacrificing insulation properties. Moreover, there may be a case in which the material of the second insulating film 50 is selected so as to improve the fluidity in the manufacturing process while sacrificing insulation properties. According to the present embodiment, even if it is necessary to use such a material for one of the first insulating film 40 and the second insulating film 50, the other one ensures the insulation.

3.2 According to the inductor component 210 of the third embodiment, the film thickness T50 of the second insulating film 50 is greater than the film thickness T40 of the first insulating film 40. This enables the insulating material to be poured easily into the gap between the first insulating film 40 and the magnetic sheet 190 in the process of producing the second insulating film 50.

3.3 According to the inductor component 210 of the third embodiment, some particles of the inorganic filler 20A and of the magnetic powder 20B in the first magnetic layer 21 protrude partially into the second insulating film 50. This can improve bonding strength between the second insulating film 50 and the first magnetic layer 21. On the other hand, particles of the inorganic filler 20A and of the magnetic powder 20B are not present on the surface of the second insulating film 50 facing the first insulating film 40. This can reduce the likelihood of the first insulating film 40 being damaged by the inorganic filler 20A and the magnetic powder 20B, which otherwise deteriorates the insulation of the inductor wires 30.

3.4 According to the inductor component 210 of the third embodiment, each inductor wire 30 is shaped like a circular column extending in the height direction Td. Accordingly, when a cross section of the inductor wire 30 is taken in a direction perpendicular to the extending direction of the inductor wire 30, the shape of the cross section has a curved edge. Accordingly, in the production of the first insulating film 40 and the second insulating film 50, it is easier to reduce the variation of the thicknesses of the first insulating film 40 and the second insulating film 50 compared with the case in which the inductor wire 30 has a cross-sectional shape having corners.

Fourth Embodiment

A fourth embodiment of the inductor component and a method of manufacturing the inductor component will be described.

The fourth embodiment is different from the first embodiment mainly in that the inductor component 310 of the fourth embodiment has the inductor wires 30 each including a first wire portion 31A and a second wire portion 31B that are disposed in the height direction Td. In the following description, elements similar to those of the first embodiment are denoted by the same reference signs, and the descriptions of such elements will be omitted or simplified.

Figure 23:
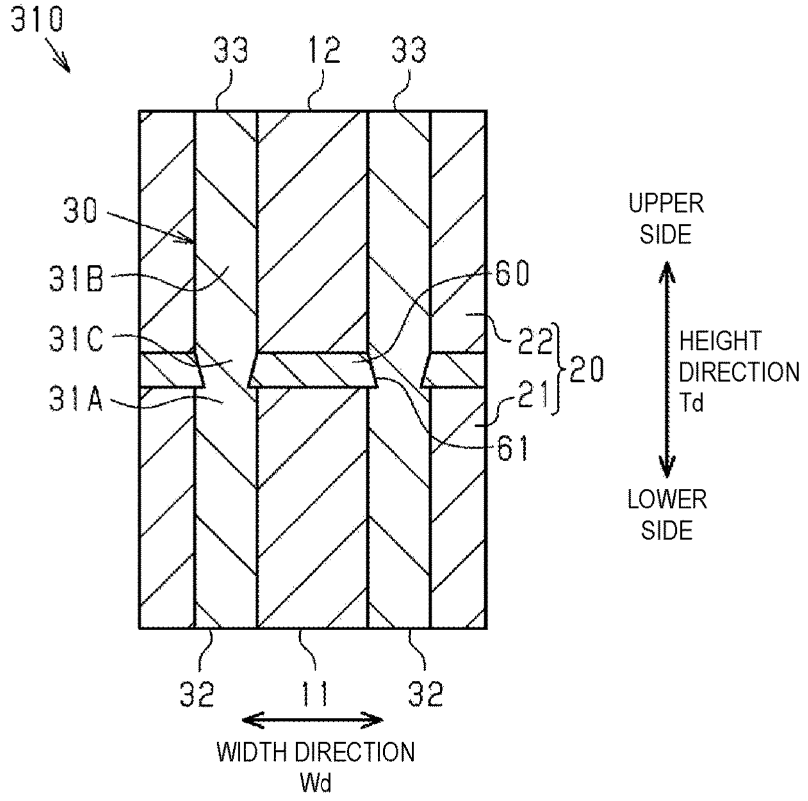
FIG. 23 is a cross-sectional view illustrating an inductor component according to a fourth embodiment.

As illustrated in FIG. 23, each inductor wire 30 of the inductor component 310 is formed of the first wire portion 31A, the second wire portion 31B, and a connection portion 31C.

The first wire portion 31A of the inductor wire 30 is shaped like a circular column, and the bottom surface of the first wire portion 31A is exposed at the first terminal surface 11 so as to form the first external terminal 32.

The top surface of the first wire portion 31A is connected to the connection portion 31C. The connection portion 31C is shaped like a circular column extending in the height direction Td. The connection portion 31C has a taper shape in which the diameter of the connection portion 31C is gradually reduced toward the first wire portion 31A. The circular bottom surface of the connection portion 31C is made smaller than the circular top surface of the first wire portion 31A. The circular top surface of the connection portion 31C has a size equal to the top surface of the first wire portion 31A. Note that the connection portion 31C includes a seed layer 380, which will be described later. The seed layer 380, however, is not illustrated in FIG. 23 since the thickness of the seed layer 380 is very small.

The second wire portion 31B is connected to the top surface of the connection portion 31C. The second wire portion 31B is shaped like a circular column extending in the height direction Td. In the present embodiment, the second wire portion 31B has the same shape and size as those of the first wire portion 31A. The top surface of the second wire portion 31B is exposed at the second terminal surface 12 and forms the second external terminal 33. In the present embodiment, the central axis of the second wire portion 31B is aligned with the central axis of the first wire portion 31A. In other words, the first wire portion 31A and the second wire portion 31B are disposed so as to be aligned with each other in the height direction Td.

In the present embodiment, the dimension of the inductor component 310 in the height direction Td is twice as large as that of the inductor component 10 of the first embodiment.

Next, a method of manufacturing the inductor component 310 of the fourth embodiment will be described.

In manufacturing the inductor component 310, the first resist layer 90 is formed first on the copper-coated base substrate 80 as is the case for the first embodiment. The first wire portions 31A of the inductor wires 30 are subsequently formed by electrolytic copper plating.

The first magnetic layer 21 is formed after the first resist layer 90 is peeled off and the copper film 82 is removed. An upper portion of the first magnetic layer 21 is shaved off so as to expose the top surfaces of the first wire portions 31A.

Figure 24:
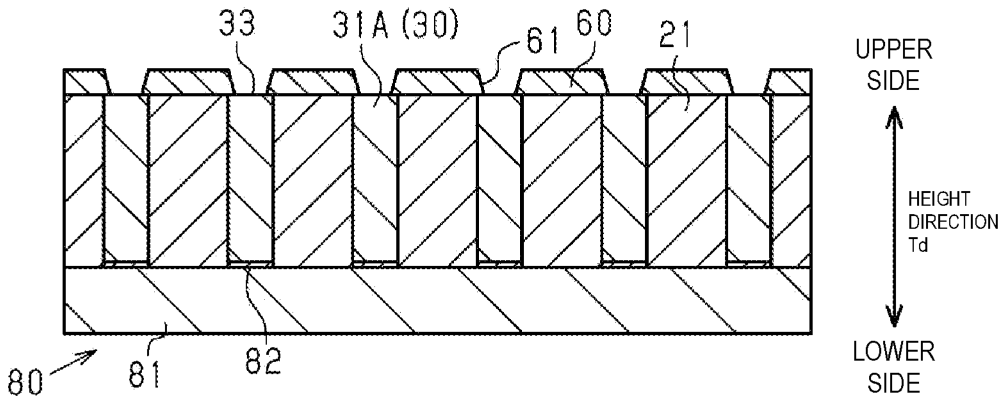
FIG. 24 is a diagram for explanation of a method of manufacturing the inductor component of the fourth embodiment.

Next, as illustrated in FIG. 24, an insulating layer 60 is formed on top of the first magnetic layer 21. More specifically, the insulating resin is applied so as to cover the top surfaces of the first magnetic layer 21 and the first wire portions 31A. The insulating resin is solidified by press forming to form the insulating layer 60. Taper-shaped holes 61 are pierced through the insulating layer 60 at positions above the first wire portions 31A using laser machining so as to expose a central portion of the top surfaces of the first wire portions 31A. Note that the thickness of the insulating layer 60 is preferably set to be one twentieth or less of the diameter D of each inductor wire 30.

Figure 25:
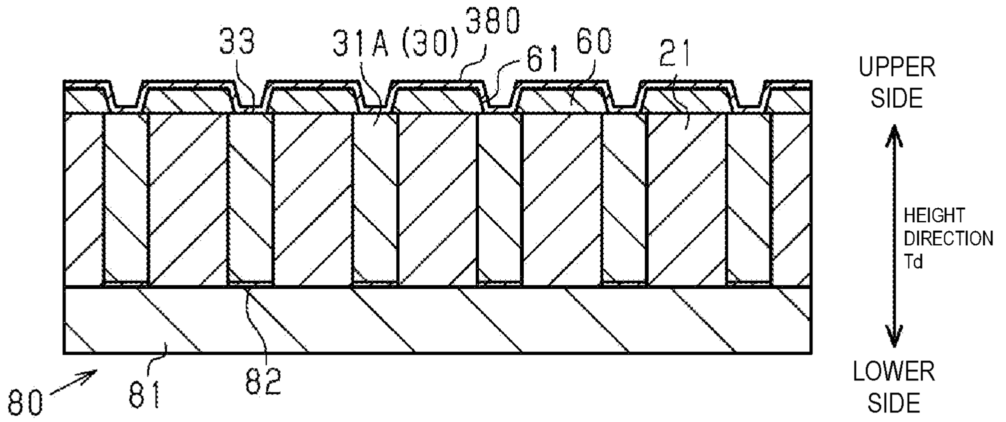
FIG. 25 is a diagram for explanation of the method of manufacturing the inductor component of the fourth embodiment.

Next, as illustrated in FIG. 25, the seed layer 380 is formed on the top surfaces of the insulating layer 60 and the first wire portions 31A. More specifically, the copper-made seed layer 380 is formed over the insulating layer 60 using sputtering.

Figure 26:
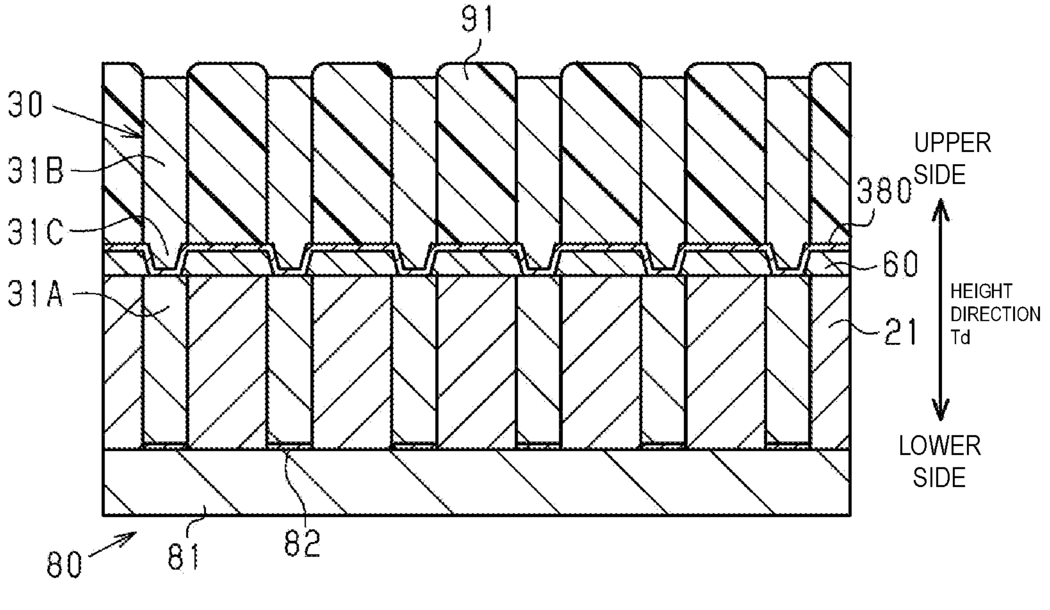
FIG. 26 is a diagram for explanation of the method of manufacturing the inductor component of the fourth embodiment.

Next, as illustrated in FIG. 26, a second resist layer 91 is formed on the upper surface of the seed layer 380 using photolithography as is the case for forming the first resist layer 90. The second resist layer 91 is formed at positions where the second wire portions 31B are not formed.

Next, the second wire portions 31B and the connection portions 31C are formed. The second wire portions 31B and the connection portions 31C are formed on the upper surface of the seed layer 380 at positions where the second resist layer 91 is not formed. More specifically, electrolytic copper plating is performed by immersing the upper surface of the seed layer 380 in an electrolytic copper plating solution, thereby forming the second wire portions 31B and the connection portions 31C that have a copper content of 99 wt % or more on the upper surface of the seed layer 380.

Next, the second resist layer 91 is removed. The second resist layer 91 is peeled off from the copper-coated base substrate 80 by physically grabbing a portion of the second resist layer 91 and separating the second resist layer 91 from the copper-coated base substrate 80.

Next, the seed layer 380 protruding from the second wire portions 31B is removed. More specifically, etching is performed to remove the seed layer 380 protruding from the second wire portions 31B.

Next, a magnetic powder-containing resin is applied. The magnetic powder-containing resin is the material of a second magnetic layer 22. The magnetic powder-containing resin is applied so as to cover the top surfaces of the second wire portions 31B. The magnetic powder-containing resin is solidified by press forming to form the second magnetic layer 22.

Figure 27:
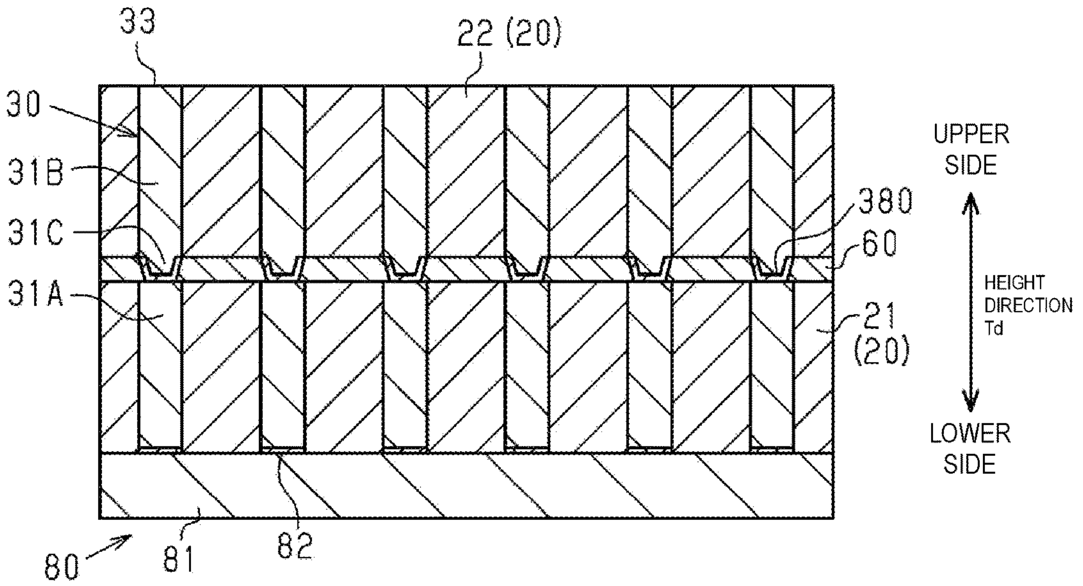
FIG. 27 is a diagram for explanation of the method of manufacturing the inductor component of the fourth embodiment.

Next, an upper portion of the second magnetic layer 22 is removed. As illustrated in FIG. 27, the upper portion of the second magnetic layer 22 is shaved off so as to expose the top surfaces of the second wire portions 31B, in other words, so as to expose the second external terminals 33. The second magnetic layer 22 and the first magnetic layer 21 described previously form the main body 20.

Figure 28:
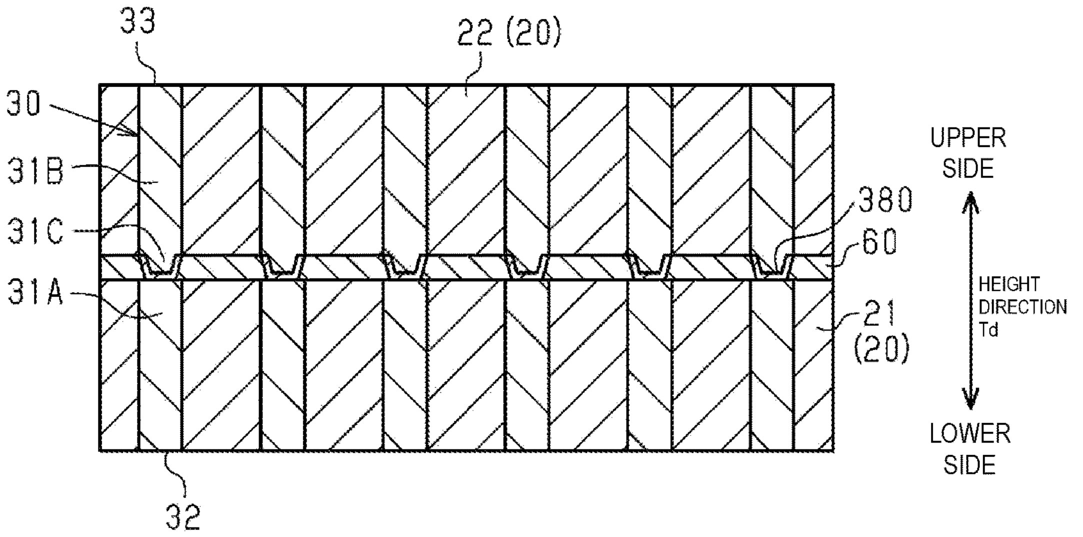
FIG. 28 is a diagram for explanation of the method of manufacturing the inductor component of the fourth embodiment.

Next, the copper-coated base substrate 80 is removed. As illustrated in FIG. 28, the copper-coated base substrate 80 is shaved off so as to expose the bottom surfaces of the first wire portions 31A, in other words, so as to expose the first external terminals 32. In the present embodiment, the bottom surfaces of the first wire portions 31A are exposed by completely shaving off the copper film 82. Note that the seed layer 380 is illustrated in an exaggerated manner in FIGS. 25 to 28. In the present embodiment, the seed layer 380, the first wire portion 31A, and the connection portion 31C are all made of copper. Accordingly, the border between the seed layer 380 and the first wire portion 31A and the border between the seed layer 380 and the connection portion 31C may not be distinguishable.

Next, advantageous effects of the inductor component 310 of the fourth embodiment will be described. According to the fourth embodiment, the following advantageous effects can be also obtained in addition to 1.1 to 1.9 described above.

4.1 According to the inductor component 310 of the fourth embodiment, the inductor wires 30 are formed by performing the electrolytic copper plating process twice. For example, in the first embodiment, the inductor wires 30 of the inductor component 10 are formed by one-time electrolytic copper plating. In the present embodiment, the inductor component 310 is formed by two-time electrolytic copper plating without changing the forming conditions of the dry film resist that are set for forming the inductor wires 30 of the inductor component 10 of the first embodiment. The dimension of the inductor wires 30 in the height direction Td can be made twice as large in this manner. Thus, the dimension of the inductor wires 30 in the height direction Td can be adjusted without changing the conditions in the manufacturing process.

Fifth Embodiment

The following describes an embodiment of an inductor-including structure that includes, along with other components, the inductor component that has been exemplified in the first to the fourth embodiments. Note that an inductor mounting substrate will be described below as an example of the inductor-including structure to which the inductor components 10 described in the first embodiment is electrically connected. Note that in the present embodiment, the same reference signs used in the first embodiment denote the same elements described in the first embodiment, and the duplicated description is omitted.

Figure 29:
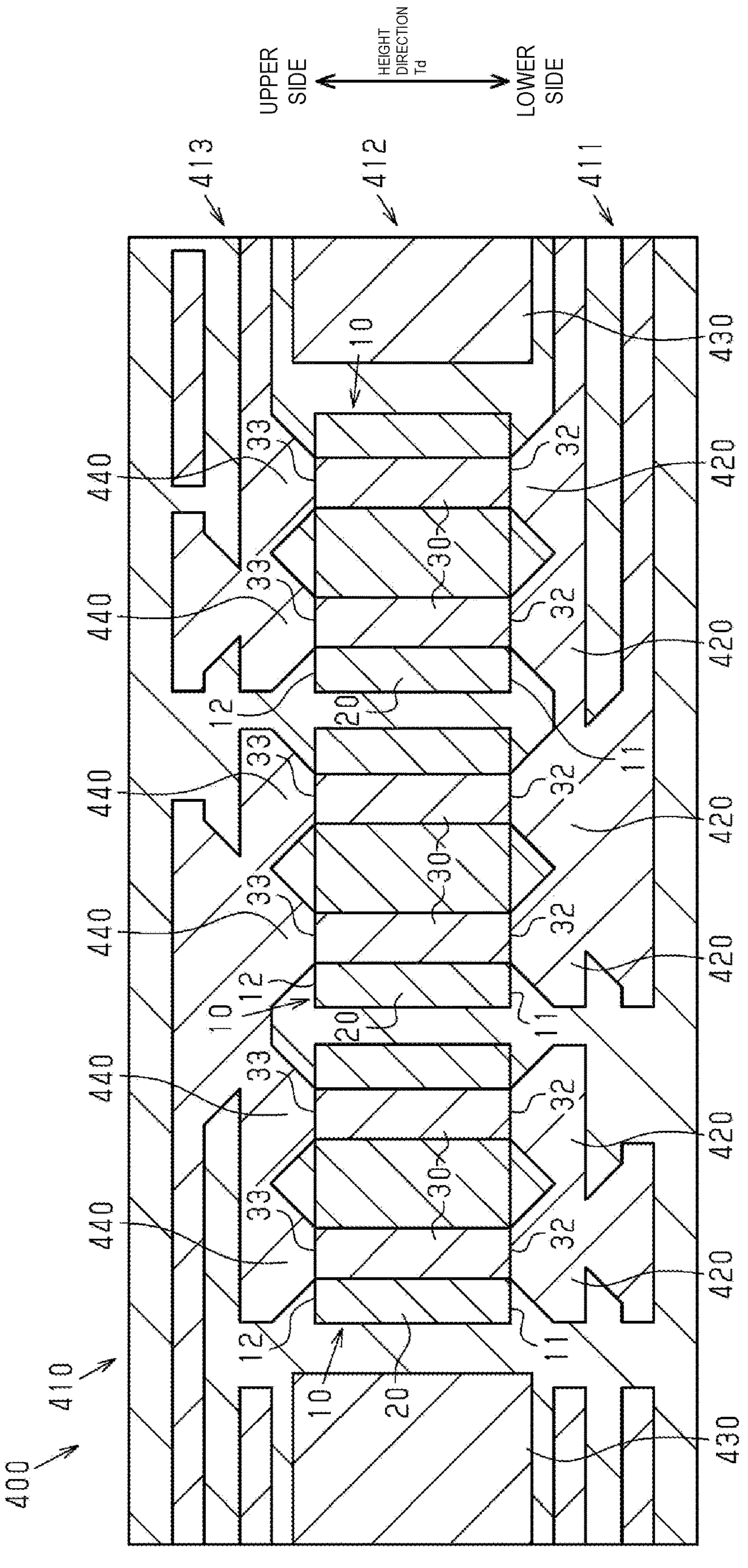
FIG. 29 is a cross-sectional view illustrating an embodiment of an inductor mounting substrate.

As illustrated in FIG. 29, an inductor mounting substrate 400 includes inductor components 10 and a substrate 410 to which the inductor components 10 are electrically connected. In the present embodiment, the inductor components 10 are embedded in the substrate 410.

In the present embodiment, the substrate 410 includes a first substrate layer 411, a second substrate layer 412, and a third substrate layer 413.

The first substrate layer 411 is shaped tabularly and includes multiple input wires 420 disposed therein. A first end of each input wire 420 is connected to a high-potential terminal of a direct current source (not illustrated). A second end of each input wire 420 is exposed at the upper surface of the first substrate layer 411.

The second substrate layer 412 is laminated on the upper surface of the first substrate layer 411. The second substrate layer 412 is shaped generally tabularly and include other components such as core members 430. The inductor components 10 are also disposed inside the second substrate layer 412. In the present embodiment, three inductor components 10 are disposed therein. The inductor components 10 are arranged such that the first end of each input wire 420 is in contact with a corresponding one of the first external terminals 32 of the inductor components 10. Accordingly, the number of the input wires 420 is the same as the number of the first external terminals 32. An input voltage is applied to the first external terminals 32 of the inductor components 10 through the input wires 420.

The third substrate layer 413 is laminated on the upper surface of the second substrate layer 412. The third substrate layer 413 is shaped generally tabularly. Multiple output wires 440 are disposed inside the third substrate layer 413. A first end of each output wire 440 is connected to a corresponding one of the second external terminals 33 of the inductor wires 30. Accordingly, the number of the output wires 440 is the same as the number of the second external terminals 33. The second end of each output wire 440 is connected to a low-potential terminal of the direct current source (not illustrated). The second external terminals 33 of the inductor components 10 applies an output voltage to the output wires 440.

Here, each inductor wire 30 has a circular column body extending in the height direction Td. When the inductor wire 30 is viewed in the height direction Td, the first external terminal 32 and the second external terminal 33 of each inductor wire 30 have the same size and are positioned so as to overlap each other. In other words, when the inductor wire 30 is viewed in the height direction Td, the connection end of the input wire 420 connected to the first external terminal 32 overlaps the connection end of the output wire 440 connected to the second external terminal 33.

Next, advantageous effects of the inductor-including structure of the present embodiment will be described. According to the inductor-including structure of the present embodiment, the following advantageous effects can be also obtained in addition to 1.1 to 1.9 described above.

5.1 According to the above-described inductor mounting substrate 400, the first terminal surfaces 11 of the inductor components 10 are laminated on the first substrate layer 411 of the substrate 410, and the second terminal surfaces 12 of the inductor components 10 are laminated on the third substrate layer 413 of the substrate 410. Accordingly, there is no conductor, such as a wire or a terminal, that extends in a direction perpendicular to the extending direction of each inductor component 10. Moreover, when the inductor components 10 are mounted on the substrate 410, it is not necessary to address short-circuiting between the first external terminals 32 and the second external terminals 33. With this configuration, as viewed in the height direction Td, the area of the substrate 410 can be reduced compared with a case in which the first external terminals 32 and the second external terminals 33 are disposed on the same surface.

The embodiments described above may be modified as below. Note that the embodiments and the modification examples below can be combined with each other insofar as technical contradictions are not generated.

In each of the above embodiments, it is sufficient that the inductor wire 30 is one that can generate a magnetic flux in the magnetic layer when an electric current flows and thereby generate inductance in the inductor component.

In each of the above embodiments, the number of the inductor wires 30 is not limited to that described by way of example. One inductor component may include three inductor wires 30 or less or may include five inductor wires 30 or more. The number of the inductor wires 30 can be changed by adjusting the cutting positions of a dicing machine when a workpiece is cut into individual components.

In each of the above embodiments, the surface of the inductor wire 30 that extends parallel to the extending direction of the inductor wire 30 need not be entirely covered with the main body 20. For example, part of the surface extending parallel to the extending direction of the inductor wire 30 may be exposed to the outside of the main body 20.

In each of the above embodiments, the inductor wire 30 need not be shaped like a circular column. For example, the inductor wire 30 may be shaped like a quadrangular prism, a polygonal column, an elliptic cylinder, or a conical column. In this case, when a cross section of the inductor wire 30 is taken in a direction perpendicular to the extending direction of the inductor wire 30, the shape of the cross section has multiple linear edges. Alternatively, for example, the shape of the cross section may have edges formed by combining a straight line and a curved line. In the case of the shape of the cross section of the inductor wire 30 having a curved edge, it is easier to fill the space with the magnetic material uniformly. Moreover, it is easier to reduce the variation of the thickness in forming the first insulating film 40 and the second insulating film 50.

In each of the above embodiments, the inductor wire 30 need not be columnar. For example, in the case of the inductor wire 30 being shaped like a regular square prism, when the inductor wire 30 is viewed in the height direction Td, the smallest circle that can encompass the inductor wire 30 is a circumcircle of a regular square. In this case, it is desirable, from the viewpoint of reducing the overall size of the inductor component, that the height T of the inductor wire 30 be greater than the diameter of the circumcircle. In addition, the shape of the inductor wire 30 is preferably columnar in the case of the inductor wire 30 extending linearly from the first terminal surface 11 to the second terminal surface 12. It is sufficient, however, that the inductor wire 30 extends generally linearly, in other words, the inductor wire 30 may have a curved portion or a helical portion. For example, insofar as the inductor wire 30 extends generally linearly, the inductor wire 30 may be partially wound helically or may have a partial meander. For example, in the case of the shape of the inductor wire 30 being such that the inductor wire 30 is wound around an axis extending in the height direction Td, when the inductor wire 30 is viewed in the height direction Td, the smallest circle drawn by the inductor wire 30 being wound is larger than or equal to a circumcircle drawn by rotating the inductor wire 30. In this case, it is desirable, from the viewpoint of reducing the overall size of the entire inductor component, that the height T of the inductor wire 30 be greater than the diameter of the smallest circle that encompasses the region that the inductor wire 30 occupies when the inductor wire 30 is viewed in the height direction Td.

In each of the above embodiments, as viewed in the height direction Td, the height T of the inductor wire 30 may be smaller than the diameter D of the circular end surface of the inductor wire 30 or may be smaller than the smallest circle encompassing the region that the inductor wire 30 occupies. It is preferable that the height T of the inductor wire 30 be more than five times as large as the diameter D of the circular end surface of the inductor wire 30 as viewed in the height direction Td because the inductance can be increased. It is preferable that the diameter D of the circular end surface of the inductor wire 30 as viewed in the height direction Td be about 200 μm or more because a substantially large current can flow therethrough.

In each of the above embodiments, the first external terminal 32 and the second external terminal 33 need not completely overlap each other as viewed in the height direction Td. As viewed in the height direction Td, the first external terminal 32 and the second external terminal 33 may partially overlap each other or need not overlap each other at all. If the first external terminal 32 and the second external terminal 33 partially overlap each other as viewed in the height direction Td, the area of the substrate surface where each terminal is present can be reduced.

In each of the above embodiments, the first external terminal 32 and the second external terminal 33 may have configurations different from those described above. For example, in an inductor component 510 that is a modification example illustrated in FIG. 30, the inductor wire 30 is formed of a wire body 31, the first external terminal 32, and the second external terminal 33. An end surface of the wire body 31 at a first end is exposed at the first terminal surface 11 of the main body 20. The first external terminal 32 is laminated on the end surface of the wire body 31 at the first end. The first external terminal 32 is formed as a two-layer structure having an anticorrosive layer 71 made of nickel and disposed closer to the wire body 31 and a solder-wettable layer 72 made of gold. The second external terminal 33 formed as the two-layer structure of the anticorrosive layer 71 and the solder-wettable layer 72 is also laminated on the end surface of the wire body 31 at the second end. The nickel-made anticorrosive layer 71 disposed at the external terminal can reduce electrochemical migration. The gold-made solder-wettable layer 72 disposed at the external terminal can improve solder wettability when the external terminal is soldered to the substrate.

One of the first external terminal 32 and the second external terminal 33 of the inductor wire 30 may be formed of a plated metal layer made of a material different from that of the inductor wire 30, and the other end of the inductor wire 30 in its extending direction may be simply exposed at the terminal surface to serve as the other external terminal.

Note that if the external terminal is formed as the layered structure, the layered structure preferably includes at least one of the anticorrosive layer 71 and the solder-wettable layer 72 to improve the reduction of the electrochemical migration or to improve the solder wettability.

If the first external terminal 32 or the second external terminal 33 is made of a material different from that of the inductor wire 30, the first external terminal 32 or the second external terminal 33 is preferably in direct contact with the inductor wire 30. In the case of the first external terminal 32 or the second external terminal 33 being in direct contact with the inductor wire 30, it is not necessary to provide an additional extension wire extended from the inductor wire 30, which leads to the reduction of the electrical resistance and the reduction of the size of the entire inductor component.

In each of the above embodiments, the external surfaces of the main body 20 may be covered with an insulating layer. For example, in the modification example illustrated in FIG. 30, a solder resist 73 made of an insulating material covers the top and bottom surfaces of the main body 20. The solder resist 73 effectively prevents short circuiting among the first external terminals 32 and among the second external terminals 33.

Figure 31:
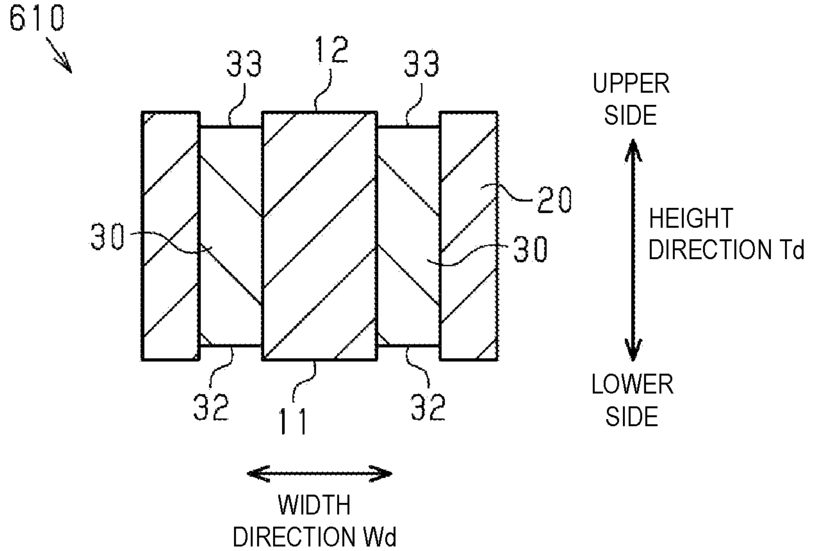
FIG. 31 is a cross-sectional view illustrating a modification example of an inductor component.

In each of the above embodiments, the first external terminal 32 need not be flush with the first terminal surface 11. For example, in an inductor component 610 of a modification example illustrated in FIG. 31, the first external terminal 32 is disposed at a recessed position inwardly relative to the first terminal surface 11 compared with the inductor component 10 of the first embodiment. The second external terminal 33 is also disposed at a recessed position relative to the second terminal surface 12. Providing recessed portions configured to engage protrusions of a substrate facilitates easy positioning of the inductor component 610 when the inductor component 610 is mounted onto the substrate.

Figure 30:
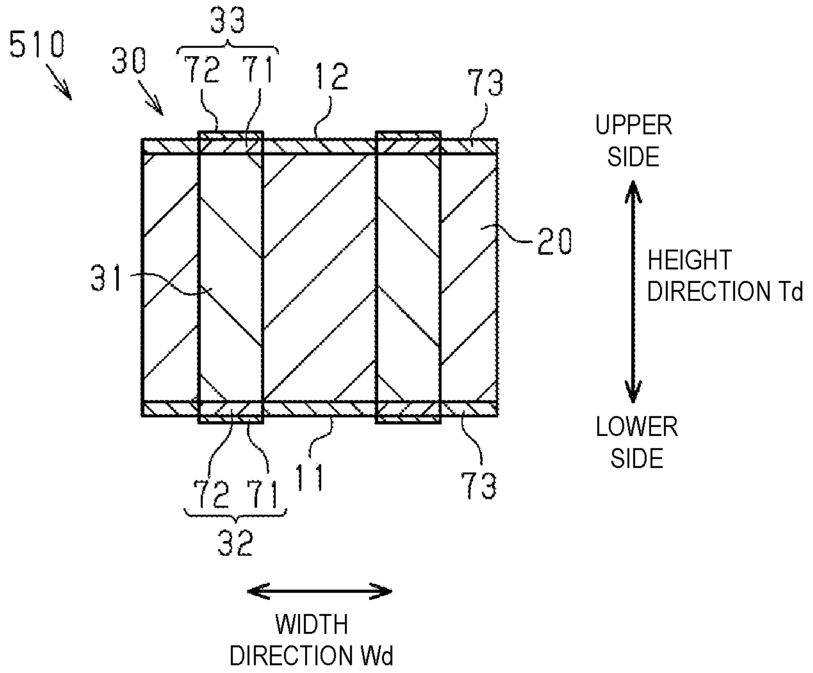
FIG. 30 is a cross-sectional view illustrating a modification example of an inductor component.

Moreover, as illustrated in the modification example of FIG. 30, the first external terminal 32 may be disposed so as to protrude outwardly from the first terminal surface 11. Similarly, the second external terminal 33 may be disposed so as to protrude outwardly from the second terminal surface 12. Providing protrusions configured to engage recessed portions of a substrate facilitates easy positioning of the inductor component 510 when the inductor component 510 is mounted onto the substrate. In this case, the thickness of the first external terminal 32 can be adjusted by laminating a copper layer onto the first end of the wire body 31.

In the modification example of FIG. 30, the second external terminal 33 may be disposed at a position recessed from the second terminal surface 12. In other words, one of the first external terminal 32 and the second external terminal 33 may protrude from the external surface of the main body 20, and the other one may be recessed from the external surface of the main body 20.

In each of the above embodiments, the shape of the main body 20 is not limited to that described by way of example. For example, the main body 20 may be shaped like a circular column or a polygonal column.

In each of the above embodiments, a maximum dimension of the main body 20 in the height direction Td may be made greater than or equal to maximum dimensions of the main body 20 in the length direction Ld and in the width direction Wd.

In each of the above embodiments, the material of the magnetic layer is not limited to that described by way of example. For example, the magnetic powder 20B may be made of iron, nickel, chromium, copper, aluminum, or an alloy containing these metals, such as an iron alloy. The resin 20C containing the magnetic powder 20B is preferably polyimide resin, acrylic resin, or phenolic resin from the viewpoint of insulation and molding characteristics. The resin 20C is not limited to these but may be epoxy resin or the like. In the case of the magnetic layer being made of the resin 20C containing the magnetic powder 20B, the magnetic layer preferably contains 60 wt % or more of the magnetic powder 20B with respect to the total weight of the magnetic layer. In addition, to improve filling performance, the resin 20C preferably contains two or three different types of magnetic powder 20B with different particle size distribution. Moreover, the material of the magnetic layer is not limited to the magnetic powder 20B but may be the resin 20C mixed with a ferrite powder or may be the resin 20C mixed with both the ferrite powder and the magnetic powder 20B.

In the second and third embodiments, the material of the first insulating film 40 and the insulating portion P2 may be different from that described by way of example. For example, the first insulating film 40 may be made of polyimide resin, acrylic resin, phenolic resin, epoxy resin, or a combination of these resins. In addition, an inorganic filler, such as silica and barium sulfate, may be mixed in the resin listed above. The same can be applied to the second insulating film 50 described in the third embodiment.

In the third embodiment, the film thickness T50 of the second insulating film 50 may be smaller than or equal to the film thickness T40 of the first insulating film 40. In this case, appropriately increasing the film thickness T50 of the second insulating film 50 enables the insulating resin to flow into the gap in the manufacturing process. On the other hand, reducing the film thickness T50 of the second insulating film 50 enables the volume of the first magnetic layer 21 to increase in the main body 20, which can improve the characteristics of the inductor component.

In the third embodiment, particles of the inorganic filler 20A and the magnetic powder 20B need not be present at the second insulating film 50. Some particles of either the inorganic filler 20A or the magnetic powder 20B may be present at the second insulating film 50, or particles of the inorganic filler 20A and the magnetic powder 20B need not be present at all.

In the third embodiment, the second insulating film 50 need not completely fill the gap between the first insulating film 40 and the first magnetic layer 21. For example, a space for relieving stress may be provided between the first insulating film 40 and the first magnetic layer 21. When the inductor component 210 is mounted on a substrate, thermal stress may be applied to the inductor component 210. The stress relieving space can reduce the likelihood of the inductor component 210 being damaged by the thermal stress. The stress relieving space can be formed in such a manner that the surface of the first insulating film 40 is processed, using plasma treatment or application treatment, so as to have a wettable portion over which the insulating resin can flow easily and a non-wettable portion over which the insulating resin cannot flow easily.

The stress relieving space between the first insulating film 40 and the first magnetic layer 21 is not limited to a void. The stress relieving space may be filled with a material, such as an inorganic filler or a resin, having a coefficient of linear thermal expansion different from that of the first insulating film 40 or the first magnetic layer 21. The stress relieving space can be formed by filling the space between the first insulating film 40 and the first magnetic layer 21 with the inorganic filler or the resin or the like.

In the fourth embodiment, the first wire portion 31A and the second wire portion 31B need not have the same shape. For example, the first wire portion 31A may be shaped like a circular column, while the second wire portion 31B may be shaped like a polygonal column.

Figure 32:
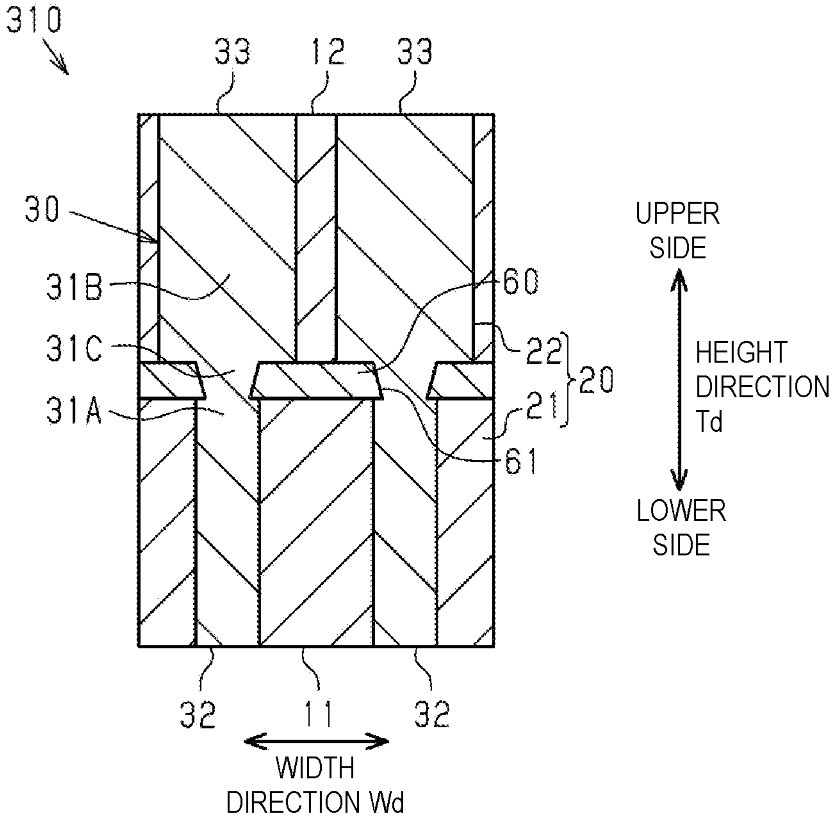
FIG. 32 is a cross-sectional view illustrating a modification example of an inductor component.

In the fourth embodiment, the first wire portion 31A and the second wire portion 31B need not have the same size. In an example illustrated in FIG. 32, when cross sections of the first wire portion 31A and the second wire portion 31B are taken in a direction perpendicular to the extending direction thereof, the area of the cross section of first wire portion 31A is different from that of the second wire portion 31B. With this configuration, for example, the inductor wire 30 can be extended while maintaining a sufficient distance from wires surrounding the inductor component 10.

Figure 33:
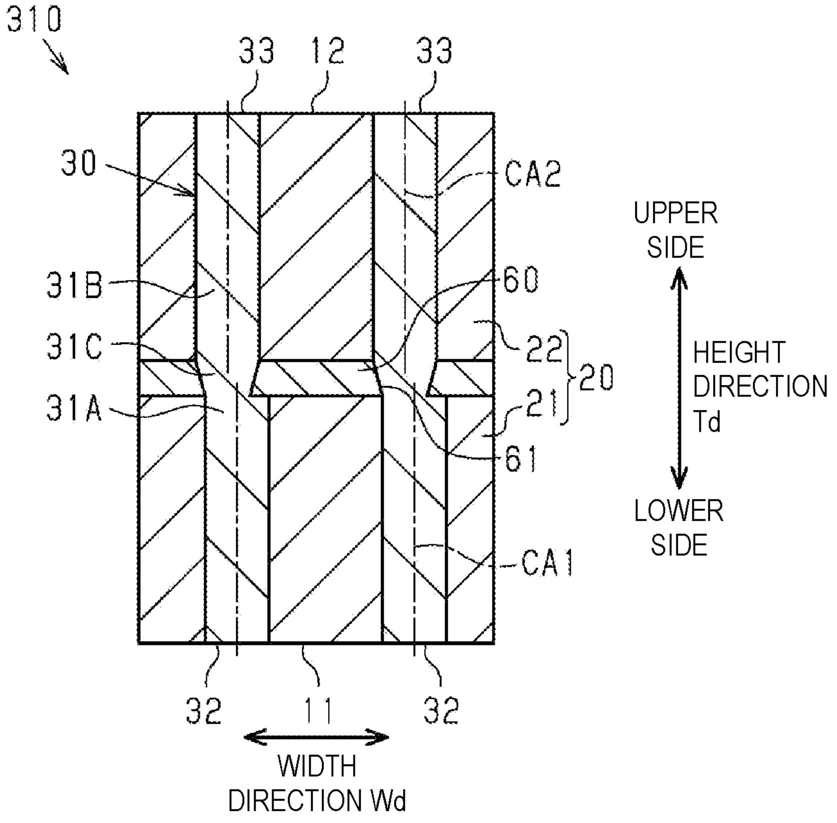
FIG. 33 is a cross-sectional view illustrating a modification example of an inductor component.

In the fourth embodiment, the central axis of the first wire portion 31A in its extending direction is aligned with the central axis of the second wire portion 31B in its extending direction. In an example illustrated in FIG. 33, however, the central axis CA1 of the first wire portion 31A in its extending direction is not aligned with the central axis CA2 of the second wire portion 31B in its extending direction. In this case, the inductor wire 30 can be extended while maintaining a sufficient distance from wires surrounding the inductor component 10. In addition, positional deviation of the connection end for the input wire from the connection end for the output wire may eliminate unnecessary wiring, which leads to a flexible design for the inductor component.

In the fourth embodiment, the shape of the connection portion 31C is not limited to that described by way of example. The connection portion 31C may be shaped like a circular column or an elliptic cylinder.

In the fourth embodiment, the material of the connection portion 31C may be different from that of the first wire portion 31A or the second wire portion 31B. For example, the material of the connection portion 31C may be lead and tin if the first wire portion 31A is soldered to the second wire portion 31B.

In the fourth embodiment, the method of manufacturing the inductor component 310 is not limited to that described by way of example. The columnar metal members P may be disposed in the height direction Td as in the second embodiment and be connected to each other by soldering or the like. Alternatively, either the first wire portions 31A or the second wire portions 31B may be formed by electrolytic plating, and the other may be formed using the columnar metal members P.

The configuration of the inductor-including structure is not limited to the example of the inductor mounting substrate in the above embodiment. For example, in an example of the inductor-including structure illustrated in FIG. 34, the first terminal surface 11 of the inductor component 10 is connected to the upper surface of a substrate 710. The substrate 710 includes input wires for applying an input voltage (not illustrated), and the input wires are connected to respective first external terminals 32 of the inductor component 10. The second terminal surface 12 of the inductor component 10 is connected to another electronic component 720 such as a sub-module or the like. The electronic component 720 includes output wires for applying an output voltage (not illustrated), and the output wires are connected to respective second external terminals 33 of the inductor component 10. As in this example, the input wires and the output wires may be included in different components, such as the substrate 710 and the electronic component 720.

Figure 34:
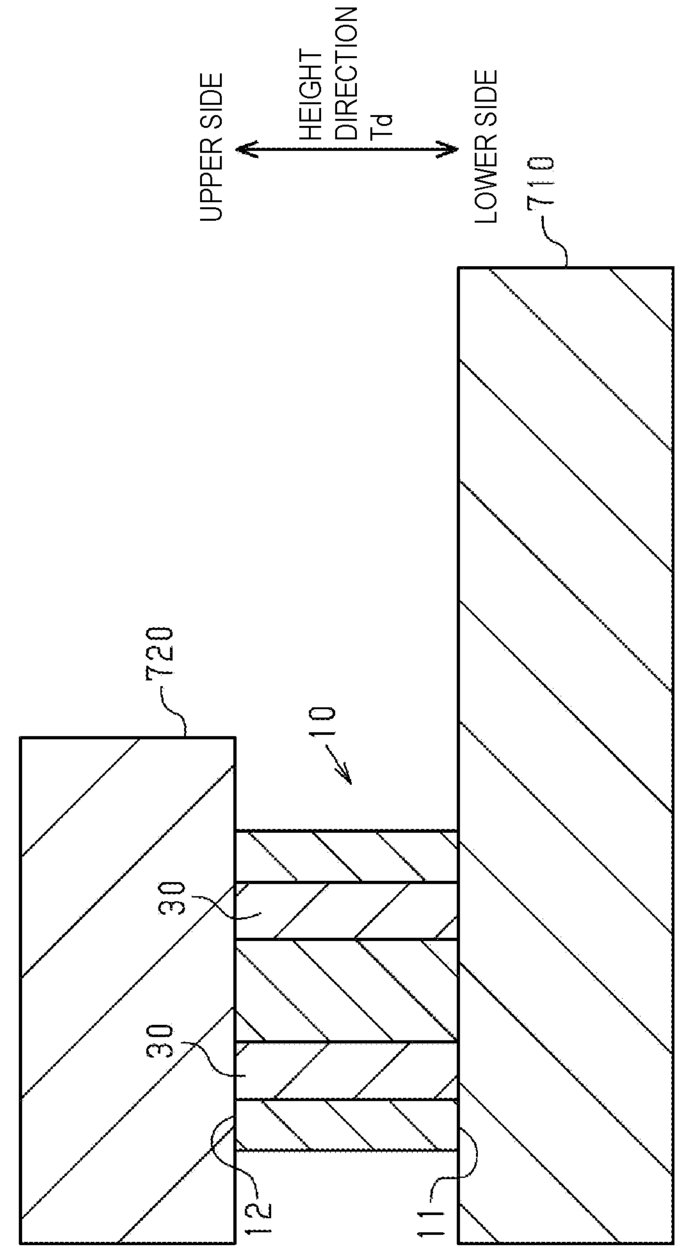
FIG. 34 is a diagram for explanation of a modification example of an inductor-including structure.

In addition, in the case of the example of FIG. 34, the inductor component 10 may be mounted not on the substrate 710 but on a mounting surface of the electronic component 720 or on another substrate. Moreover, another electronic component may be interposed between the inductor component 10 and the substrate 710.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component, comprising:

a main body having a magnetic layer including a magnetic material including a magnetic powder, and a portion of the magnetic powder is present between an insulating film and the magnetic layer, a first terminal surface, and a second terminal surface positioned opposite to the first terminal surface in a height direction extending perpendicular to the first terminal surface;

an inductor wire disposed in the main body and extending linearly in the height direction;

a first external terminal disposed at a first end of the inductor wire and exposed only at the first terminal surface; and a second external terminal disposed at a second end of the inductor wire, the second end being opposite to the first end and exposed only at the second terminal surface.

2. The inductor component according to claim 1, wherein when the inductor wire is viewed in the height direction, a dimension of the inductor wire in the height direction is greater than a diameter of a smallest circle that encompasses a region that the inductor wire occupies.

3. The inductor component according to claim 1, wherein the inductor wire has a columnar body extending in the height direction.

4. The inductor component according to claim 1, wherein as viewed in the height direction, the first external terminal and the second external terminal overlap each other at least partially.

5. The inductor component according to claim 1, wherein a maximum dimension of the main body in the height direction is smaller than a maximum dimension of the main body in a direction perpendicular to the height direction.

6. The inductor component according to claim 1, wherein when a side surface of the inductor wire is defined as a surface or surfaces of the inductor wire other than a surface at which the first external terminal is disposed and a surface at which the second external terminal is disposed, the side surface of the inductor wire is covered with the magnetic layer.

7. The inductor component according to claim 1, wherein the main body has an additional insulating film made of an insulating material, and when a side surface of the inductor wire is defined as a surface or surfaces of the inductor wire other than a surface at which the first external terminal is disposed and a surface at which the second external terminal is disposed, the side surface is in contact with the additional insulating film.

8. The inductor component according to claim 7, wherein the main body has the insulating film made of an insulating material, and the insulating film is in contact with a surface of the additional insulating film that is opposite to the surface thereof facing the inductor wire.

9. The inductor component according to claim 8, wherein a film thickness of the insulating film is greater than a film thickness of the additional insulating film.

10. The inductor component according to claim 8, wherein a stress relieving space is provided between the additional insulating film and the magnetic layer.

11. The inductor component according to claim 1, wherein when a cross section of the inductor wire is taken in a direction perpendicular to an extending direction of the inductor wire, at least a portion of edge of the cross section of the inductor wire is a curved shape.

12. The inductor component according to claim 1, wherein at least one of the first external terminal and the second external terminal has a layered structure that includes at least one of a copper-containing layer, a nickel-containing layer, a tin-containing layer, and a gold-containing layer.

13. The inductor component according to claim 1, wherein the first end of the inductor wire is configured as the first external terminal.

14. The inductor component according to claim 1, wherein the first external terminal protrudes from the first terminal surface.

15. The inductor component according to claim 1, wherein the first external terminal is recessed from the first terminal surface.

16. The inductor component according to claim 1, further comprising:

a plurality of the inductor wires, wherein the plurality of the inductor wires is arranged in a direction parallel to the first terminal surface.

17. The inductor component according to claim 1, wherein the inductor wire has a first wire portion that is shaped like a column and extends in the height direction and has a second wire portion that is shaped like a column and extends in the height direction, the first wire portion and the second wire portion are arrayed in the height direction, and when the first wire portion and the second wire portion have respective cross sections taken in a direction perpendicular to an extending direction of the first wire portion and the second wire portion, an area of the cross section of the first wire portion is different from an area of the cross section of the second wire portion.

18. The inductor component according to claim 1, wherein the inductor wire has a first wire portion that is shaped like a column and extends in the height direction and also has a second wire portion that is shaped like a column and extends in the height direction, the first wire portion and the second wire portion are arrayed in the height direction, and a central axis of the first wire portion in an extending direction of the first wire portion is shifted from a central axis of the second wire portion in an extending direction of the second wire portion.

19. An inductor component, comprising:

a main body having a magnetic layer including a magnetic material, a first terminal surface, a second terminal surface positioned opposite to the first terminal surface in a height direction extending perpendicular to the first terminal surface, a first insulating film made of an insulating material, and a second insulating film made of an insulating material;

an inductor wire disposed in the main body and extending linearly in the height direction;

a first external terminal disposed at a first end of the inductor wire and exposed only at the first terminal surface; and a second external terminal disposed at a second end of the inductor wire, the second end being opposite to the first end and exposed only at the second terminal surface, wherein when a side surface of the inductor wire is defined as a surface or surfaces of the inductor wire other than a surface at which the first external terminal is disposed and a surface at which the second external terminal is disposed, the side surface is in contact with the first insulating film;

the second insulating film is in contact with a surface of the first insulating film that is opposite to the surface thereof facing the inductor wire; and a stress relieving space is provided between the first insulating film and the magnetic layer.

* * * * *